US007504026B2

(12) United States Patent
Matsuura et al.

(10) Patent No.: US 7,504,026 B2
(45) Date of Patent: Mar. 17, 2009

(54) ULTRASONIC SOLUTION SEPARATION APPARATUS

(75) Inventors: Kazuo Matsuura, Naruto (JP); Fusaisugu Abe, Naruto (JP)

(73) Assignee: Ultrasound Brewery, Tokushima (JP)

( * ) Notice: Subject to any disclaimer, the term of this patent is extended or adjusted under 35 U.S.C. 154(b) by 9 days.

(21) Appl. No.: 11/822,248

(22) Filed: Jul. 3, 2007

(65) Prior Publication Data

US 2008/0017560 A1 Jan. 24, 2008

(30) Foreign Application Priority Data

Jul. 5, 2006 (JP) ............................. 2006-185980
Jun. 27, 2007 (JP) ............................. 2007-169587

(51) Int. Cl.
*B01D 33/70* (2006.01)
*B01D 33/80* (2006.01)

(52) U.S. Cl. ............................... 210/151; 95/29; 95/30; 96/389; 96/175; 96/219; 96/6; 435/291.1; 431/10; 126/93; 126/95

(58) Field of Classification Search ................. 210/151; 95/29, 30; 96/389, 175, 219, 467, 6; 435/291.1; 99/467, 470; 431/10; 126/93, 95; 261/78.2, 261/81
See application file for complete search history.

(56) References Cited

FOREIGN PATENT DOCUMENTS

JP 2001-314724 A 11/2001

*Primary Examiner*—Walter D Griffin
*Assistant Examiner*—Cameron J Allen
(74) *Attorney, Agent, or Firm*—Birch, Stewart, Kolasch & Birch, LLP

(57) ABSTRACT

The ultrasonic solution separation apparatus oscillates an undiluted solution containing a target material at an ultrasonic frequency to produce mist, and collects the mist to collect a target material containing liquid that contains the target material with higher concentration than the undiluted solution. The ultrasonic solution separation apparatus includes an atomization chamber that oscillates the undiluted solution at an ultrasonic frequency by using a plurality of ultrasonic oscillators to produce the mist; and a collection portion that aggregates and thus collects the mist produced in the atomization chamber. The atomization chamber is divided into a plurality of divided chamber sections so that the ultrasonic oscillators are disposed in the respective divided chamber sections. The ultrasonic oscillators oscillate the undiluted solution supplied into the divided chamber sections to produce the mist. The mist ejected from the divided chamber sections is collected to obtain the target material containing liquid.

16 Claims, 12 Drawing Sheets

2···ULTRASONIC OSCILLATOR

70 • • • SOLUTION SUPPLY TUBE

72 • • • GAS SUPPLY TUBE

ULTRASONIC SOLUTION SEPARATION APPARATUS

1. FIELD OF THE INVENTION

The present invention relates to an ultrasonic separation apparatus that separates a solution with high concentration of a target material from alcohol such as sake (Japanese rice wine) and sake material, oil or crude oil.

2. DESCRIPTION OF THE RELATED ART

The present inventor has been developed which oscillates an undiluted solution at an ultrasonic frequency to produce mist and collects the mist to separate a target material that is contained in the undiluted solution (see Patent Laid-Open Publication No. 2001-314724).

This separation apparatus oscillates the undiluted solution that contains alcohol, for example, at an ultrasonic frequency to produce fine mist in carrier gas, and separates and collects the produced mist from the carrier gas whereby separate alcohol solution with higher concentration than the undiluted solution. This type of separation apparatus can separate high concentration alcohol at lower energy as compared with an apparatus that vaporizes an undiluted solution with heat.

SUMMARY OF THE INVENTION

In order to increase performance, in an apparatus that separates a solution that contains a target material, e.g., alcohol, with high concentration by using ultrasonic oscillation, it is necessary to use many ultrasonic oscillators. The reason is that, since the output of one ultrasonic oscillator is comparatively small, a plurality of ultrasonic oscillators are used to improve performance. In addition, the reason is that many small output ultrasonic oscillators are used to oscillate many parts of the liquid surface at an ultrasonic frequency to efficiently atomize the liquid into mist from the liquid surface. For example, in some ultrasonic separation apparatuses, the total output of ultrasonic oscillators is set to 1 kW to several hundreds kW. In this case, when one ultrasonic oscillator has output of 10 W, one hundred to several ten thousands of, a very large number of ultrasonic oscillators are used.

However, in ultrasonic separation apparatuses that atomize an undiluted solution into mist by using a plurality of ultrasonic oscillators, there is a problem that it is difficult to efficiently collect the mist produced by the ultrasonic oscillators. In particular, in a separation apparatus that includes a plurality of ultrasonic oscillators that are disposed in an atomization chamber, and transfers the mist that is produced by these ultrasonic oscillators from the atomization chamber to a collection portion to collect the mist, there is a problem that cannot efficiently eject the mist produced by the many ultrasonic oscillators from the atomization chamber. The reason is that, before the fine mist that is produced by the ultrasonic oscillators is ejected from the atomization chamber, the mist clusters collide with each other and aggregate, thus the mist cannot be ejected from the atomization chamber.

Therefore, the present invention has developed to solve the above disadvantages. It is a first object of the present invention to provide an ultrasonic solution separation apparatus that can efficiently collect mist that is produced by a plurality of ultrasonic oscillators, and can efficiently eject the mist from an atomization chamber.

In addition, in order to increase performance, in an apparatus that separates a solution that contains a target material, e.g., alcohol, with high concentration by using ultrasonic oscillation, it is necessary to replace ultrasonic oscillators in a certain period of time. The reason is that, if an ultrasonic oscillator reaches its end of life after use of a certain period of time, it cannot efficiently oscillate at an ultrasonic frequency. Since an ultrasonic oscillator mechanically oscillates with small amplitude by high-frequency power supplied thereto, its life is short as compared with other electronic devices. After one or two years, it will not efficiently oscillate at an ultrasonic frequency. However, in ultrasonic separation apparatuses that use many ultrasonic oscillators, replacement of ultrasonic oscillators remarkably requires time and effort. Particularly, since ultrasonic oscillators that are fastened on the bottom of an atomization chamber are watertightly fastened so that leakage does not occur, replacement of them requires more time and effort. The reason is that it is necessary to replace the ultrasonic oscillator in the state where packing or the like is interposed in proper arrangement to perfectly achieve watertight structure.

Therefore, the present invention has developed to further solve this disadvantage. It is a second object of the present invention to provide an ultrasonic solution separation apparatus that can easily replace an ultrasonic oscillator.

To achieve the foregoing objects, an ultrasonic solution separation apparatus according to the present invention has the following configuration.

The ultrasonic solution separation apparatus oscillates an undiluted solution containing a target material at an ultrasonic frequency to produce mist, and collects the mist to collect a target material containing liquid that contains the target material with higher concentration than the undiluted solution. The ultrasonic solution separation apparatus includes an atomization chamber that oscillates the undiluted solution at an ultrasonic frequency by using a plurality of ultrasonic oscillators to produce the mist; and a collection portion that aggregates and thus collects the mist produced in the atomization chamber. The atomization chamber is divided into a plurality of divided chamber sections so that the ultrasonic oscillators are disposed in the divided chamber sections. The ultrasonic oscillators oscillate the undiluted solution that is supplied into the divided chamber sections at an ultrasonic frequency to produce the mist, in addition, the mist that is ejected from the divided chamber sections is collected to collect the target material containing liquid.

In the ultrasonic solution separation apparatus according to the present invention, partitions can divide the interior of the atomization chamber into the plurality of divided chamber sections.

In the ultrasonic solution separation apparatus according to the present invention, the partitions can divide the interior of the atomization chamber in a grid shape so that the plurality of divided chamber sections are arranged adjacent to each other in length and width directions, in addition, communication openings can be opened in lower end parts of the partitions that are located between the divided chamber sections adjacent to each other so that the undiluted solution that is supplied to the atomization chamber can move between the divided chamber sections adjacent to each other.

In the ultrasonic solution separation apparatus according to the present invention, the plurality of divided chamber sections can be communicated to each other in series through the communication openings.

In the ultrasonic solution separation apparatus according to the present invention, a plurality of unit cases can be arranged in the interior of the atomization chamber, and the divided chamber sections can be defined by the unit cases.

In the ultrasonic solution separation apparatus according to the present invention, supplying openings that supply carrier gas to the mist of the undiluted solution that is produce by the ultrasonic oscillators can be arranged in bottom parts of the divided chamber sections, in addition, the produced mist can pass divided chamber section and can be ejected outside by using the carrier gas that is supplied through the supplying openings.

In the ultrasonic solution separation apparatus according to the present invention, tubelike members can be disposed above the ultrasonic oscillators, in addition, the tubelike members can have openings that discharge the undiluted solution that is oscillated at an ultrasonic frequency by the ultrasonic oscillators to produce the mist.

In the ultrasonic solution separation apparatus according to the present invention, the tubelike member can include an inner tubelike sectiona and an outer tubelike sectionb outside the inner tubelike sectiona, and a carrier gas duct can be arranged between the inner tubelike sectiona and the outer tubelike sectionb, in addition, the duct can have the supplying opening that is opened around the periphery of the opening of the tubelike member, and can discharge the carrier gas through the supplying opening.

In the ultrasonic solution separation apparatus according to the present invention, the atomization chamber can include a plurality of ultrasonic units, and a base that detachably mounts the ultrasonic units. In addition, the ultrasonic unit can include a unit case that is supplied with the undiluted solution in the interior of the unit case, the ultrasonic oscillator that is arranged on the bottom of unit case, and a tubelike member that has an opening that discharges the undiluted solution that is oscillated at an ultrasonic frequency by the ultrasonic oscillator to produce the mist. In addition, the interior of the unit case can serve as the divided chamber section, and the unit case can have a supplying opening that supplies carrier gas to the mist of the undiluted solution that is discharged from the tubelike member. In this ultrasonic solution separation apparatus, the plurality of ultrasonic units can be mounted to the base so that the undiluted solution is supplied to each unit case from the base, in addition, the mist that is discharged from the tubelike member can be ejected outside the divided chamber section by using the carrier gas that is supplied to the supplying opening so that the mist that is ejected from the ultrasonic units is collected to collect the target material containing liquid.

In the ultrasonic solution separation apparatus according to the present invention, a detachable unit can be composed of the ultrasonic oscillator and the tubelike member that are unitarily coupled to each other, in addition, the detachable unit can be detachably mounted to the bottom of the divided chamber section.

In the ultrasonic solution separation apparatus according to the present invention, the apparatus can include connection units, in addition, the connection unit is composed of a high frequency power source and the ultrasonic oscillator that are unitarily coupled to each other. The high frequency power source is connected to the ultrasonic oscillator, and supplies high-frequency power to the ultrasonic oscillator to oscillate the ultrasonic oscillator at an ultrasonic frequency. In addition, the connection unit is detachably mounted to the bottom of the divided chamber section.

In the ultrasonic solution separation apparatus according to the present invention, the unit case can include a solution supply tube that supplies the undiluted solution, and a power cord that supplies electric power to the ultrasonic oscillator, in addition, an ultrasonic unit can be mounted to the base so that the solution supply tube and the power cord are detachably connected to the base.

In the ultrasonic solution separation apparatus according to the present invention, the unit case can include a gas supplying tube that supplies carrier gas to a duct of the tubelike member, in addition, the ultrasonic unit can be mounted to the base so that the gas supplying tube is detachably connected to the base to be.

In the ultrasonic solution separation apparatus according to the present invention, a demister can be disposed in the atomization chamber on the ejection side where the carrier gas containing the mist is ejected, and the demister can collect a part of the mist.

The ultrasonic solution separation apparatus according to the present invention has an advantage that can efficiently collects mist that is produced by a plurality of ultrasonic oscillators, and can efficiently eject the mist from an atomization chamber. The reason is that a plurality of divided chamber sections are disposed in the atomization chamber in which an undiluted solution is oscillated at an ultrasonic frequency and atomized into the mist, and the ultrasonic oscillators that is disposed in the divided chamber sections oscillate the undiluted solution at an ultrasonic frequency to produce the mist so that the mist that is ejected from the divided chamber sections is collected to collect the target material containing liquid. In this configuration that divides the interior of the atomization chamber into a plurality of divided chamber sections so that the ultrasonic oscillators are disposed in the divided chamber sections, since the mist produced by the plurality of ultrasonic oscillators is transferred along the divided chamber sections and is ejected from the atomization chamber, the produced mist can be efficiently collected. Mist clusters that flow in the divided chamber sections are transferred without interfering with each other, in other words, gas flows are not disturbed in transport paths and are smoothly transferred, in addition, mist clusters do not collides with each other and do not aggregate. As a result, mist can be efficiently collected. Therefore, it is possible to achieve an advantage feature that can efficiently collect mist that is produced by a plurality of ultrasonic oscillators, and can efficiently eject the mist from an atomization chamber to improve the collection efficiency of target material containing liquid.

In particular, in the ultrasonic separation apparatus according to another aspect of the present invention in which supplying openings that supply carrier gas to the mist are arranged in bottom parts of the divided chamber sections, and the produced mist passes divided chamber section and is ejected outside by using the carrier gas that is supplied through the supplying openings, the flow of the carrier gas that transfers the mist that is produced by the ultrasonic oscillator is controlled in each divided chamber section to ideally transfer the produced mist to eject the produced mist from the divided chamber section, therefore, it is possible to improve the collection efficiency of mist.

Furthermore, the ultrasonic separation apparatus according to another aspect of the present invention can provide an advantage that can easily replace an ultrasonic oscillator. The reason is that the ultrasonic separation apparatus according to this invention includes a plurality of ultrasonic units, and a base that detachably mounts the ultrasonic units, in addition, the ultrasonic unit includes a unit case that is supplied with the undiluted solution to the interior of the unit case, the ultrasonic oscillator that oscillates the undiluted solution at an ultrasonic frequency, and a tubelike member that has an opening that discharges the undiluted solution that is oscillated at an ultrasonic frequency to produce the mist, in addition, the plurality of ultrasonic units are mounted to the base so that the undiluted solution is supplied to each unit case from the base, and the mist that is discharged from the unit case is ejected by using the carrier gas so that the mist that is ejected from the ultrasonic units is collected to collect the target material containing liquid. In thus-configured ultrasonic separation apparatus, since each of the ultrasonic units includes the ultrasonic oscillator, and these ultrasonic units are mounted to the base, in the case of replacement of the ultrasonic oscillator, the ultrasonic unit is detached from the base to replace the ultrasonic oscillator. Therefore, it is possible to provide an advantage that can easily replace the ultrasonic oscillator. As a result, in the ultrasonic separation apparatus that includes many ultrasonic oscillators, the ultrasonic oscillators can be replaced at less expense in time and effort. Consequently, it is possible to reduce maintenance cost, and to improve the operation efficiency of the apparatus. Additionally, in the ultrasonic separation apparatus according to the present invention also has advantages that high volume production of the ultrasonic units provides easy extension in size, and reduces production cost.

In addition, in the ultrasonic separation apparatus according to the above aspect of the present invention, since the ultrasonic oscillator is fastened to the unit case that is mounted to the base, it is possible to provide an advantage that can replace the ultrasonic oscillator with an ideal waterproof structure. The reason is that, in the ultrasonic separation apparatus according to the present invention, dissimilarly to a conventional apparatus in which ultrasonic oscillators are fastened to an atomization chamber to achieve a waterproof structure at much expense in time and effort, it is simple to replace the unit case in which the ultrasonic oscillator is fastened with an ideal waterproof structure.

In addition, in the ultrasonic separation apparatus according to the above aspect of the present invention, since each unit case of the ultrasonic unit has a supplying opening that supplies carrier gas to the mist that is discharged from the tubelike member, it is possible to achieve an advantage that the flow of the carrier gas that transfers the mist that is produced by the ultrasonic oscillator is controlled in each unit case. Accordingly, the mist that is produced by the ultrasonic oscillator is ideally transferred and ejected from the unit case by using the carrier gas. Therefore, it is possible to improve the collection efficiency of mist.

Furthermore, in the ultrasonic separation apparatus according to another aspect of the present invention in which a connection unit is composed of the ultrasonic oscillator and the tubelike member that are unitarily coupled to each other, and the connection unit is detachably mounted to the bottom of the divided chamber section, it is possible to provide an advantage that can easily replace the ultrasonic oscillator.

Moreover, in the ultrasonic separation apparatus according to another aspect of the present invention in which a connection unit is composed of a high frequency power source and the ultrasonic oscillator that are unitarily coupled to each other, and the connection unit is detachably mounted to the bottom of the divided chamber section, it is possible to provide an advantage that can easily replace the ultrasonic oscillator.

The above and further objects of the present invention as well as the features thereof will become more apparent from the following detailed description to be made in conjunction with the accompanying drawings.

DETAILED DESCRIPTION OF THE PREFERRED EMBODIMENTS

Figure 1:
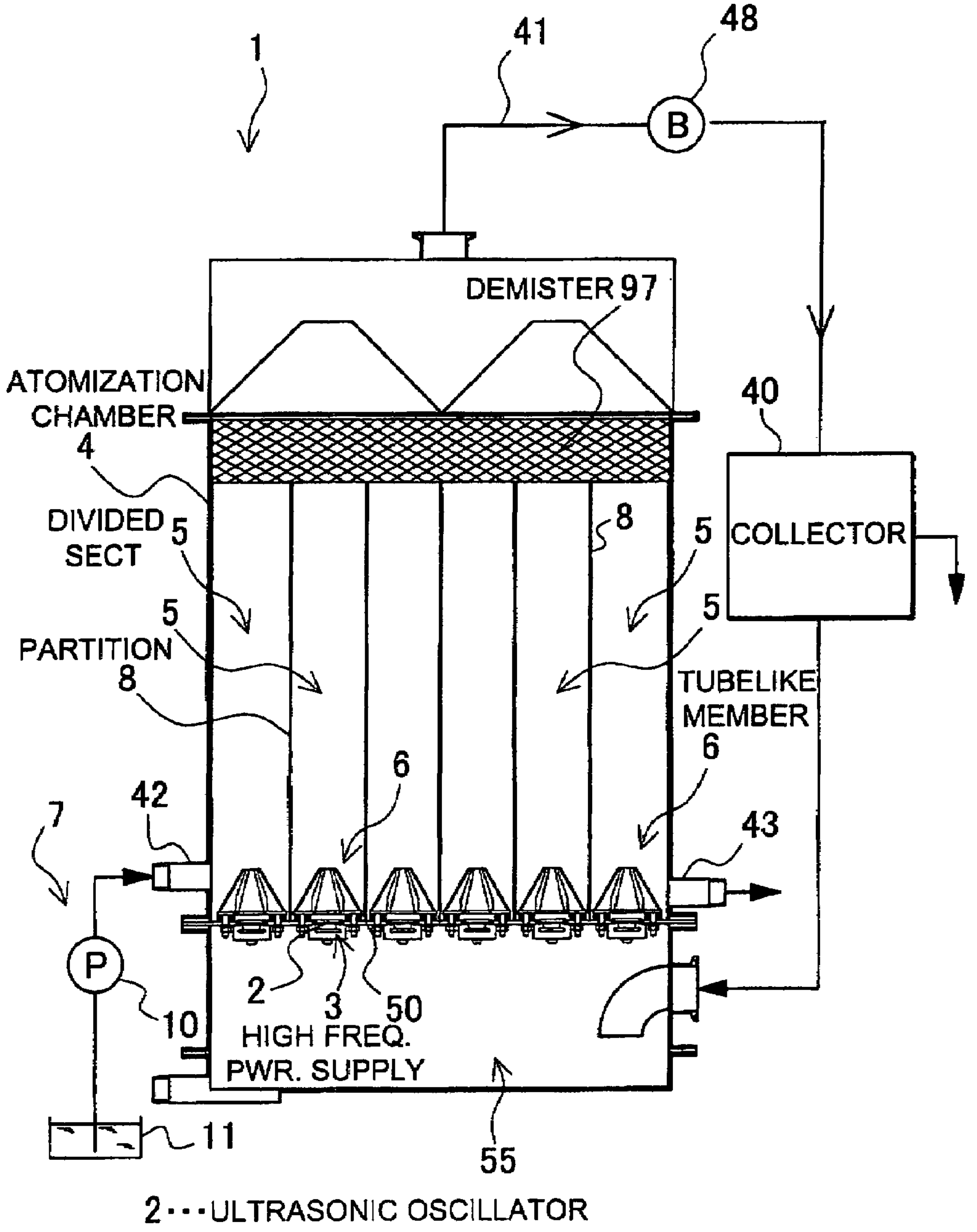
FIG. 1 is a schematic view showing the structure of an ultrasonic separation apparatus according to one embodiment of the present invention.

An ultrasonic solution separation apparatus according to the present invention oscillates an undiluted solution containing a target material at an ultrasonic frequency to produce mist, and collects the mist to collect a target material containing liquid that contains the target material with higher concentration than the undiluted solution. The following ultrasonic solution separation apparatus oscillates a solution containing at least two kinds of materials at an ultrasonic frequency to produce mist, and aggregates and thus collects the produced mist to separate a specified material with high concentration. In the ultrasonic separation apparatus, although solvent and solute of the solution are not limited, generally, an example of the solvent is provided by water. However, besides water, organic solvents such as alcohol can also be used. Examples of solution are provided as follows.

(1) Sake, beer, wine, vinegar, mirin (rice cooking wine), spirits, shochu, brandy, whiskey and liqueur.

(2) Solutions containing perfumes such as pinene, linalool, limonene and polyphenol group, and aromatic compounds or fragrant compounds.

(3) Solutions containing alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(4) Solutions containing compounds obtained by substituting a halogen(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(5) Solutions containing compounds obtained by substituting a hydroxy group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(6) Solutions containing compounds obtained by substituting an amino group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(7) Solutions containing compounds obtained by substituting a carbonyl group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(8) Solutions containing compounds obtained by substituting a carboxyl group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(9) Solutions containing compounds obtained by substituting a nitro group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(10) Solutions containing compounds obtained by substituting a cyano group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(11) Solutions containing compounds obtained by substituting a mercapto group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(12) Solutions containing compounds obtained by substituting a metal ion(s) for at least one atom of the aforementioned solutions of (3) to (11).

(13) Solutions containing compounds obtained by substituting an arbitrary molecule(s) of molecules mentioned in (3) to (11) for an arbitrary hydrogen atom(s), carbon atom(s) or functional group(s) included in the aforementioned solutions of (3) to (11).

When a solution containing two or more materials is oscillated at an ultrasonic frequency to separate mist from the solution, and such separated mist is aggregated and collected, concentrations of contained material differs between the solution collected from the mist and the remaining solution after the mist is produced. For example, when an aqueous alcohol solution is atomized into mist by the ultrasonic oscillation and the produced mist is collected, the produced mist thus collected have a higher concentration of alcohol than the remaining alcohol after the mist is produced. The reason for such higher alcohol concentration in the solution obtained by aggregating and collecting the mist is that when compared with the water, the alcohol is easier to be atomized into the mist by the ultrasonic oscillation.

The following description describes an ultrasonic separation apparatus that atomizes alcohol as a solution into mist, and can collect the mist to separate high concentration alcohol. However, in the present invention, a solution to be separated is not limited to alcohol. The present invention can be applied to separate the aforementioned solutions, and other solutions that can be atomized into mist to be separated.

Figure 9:
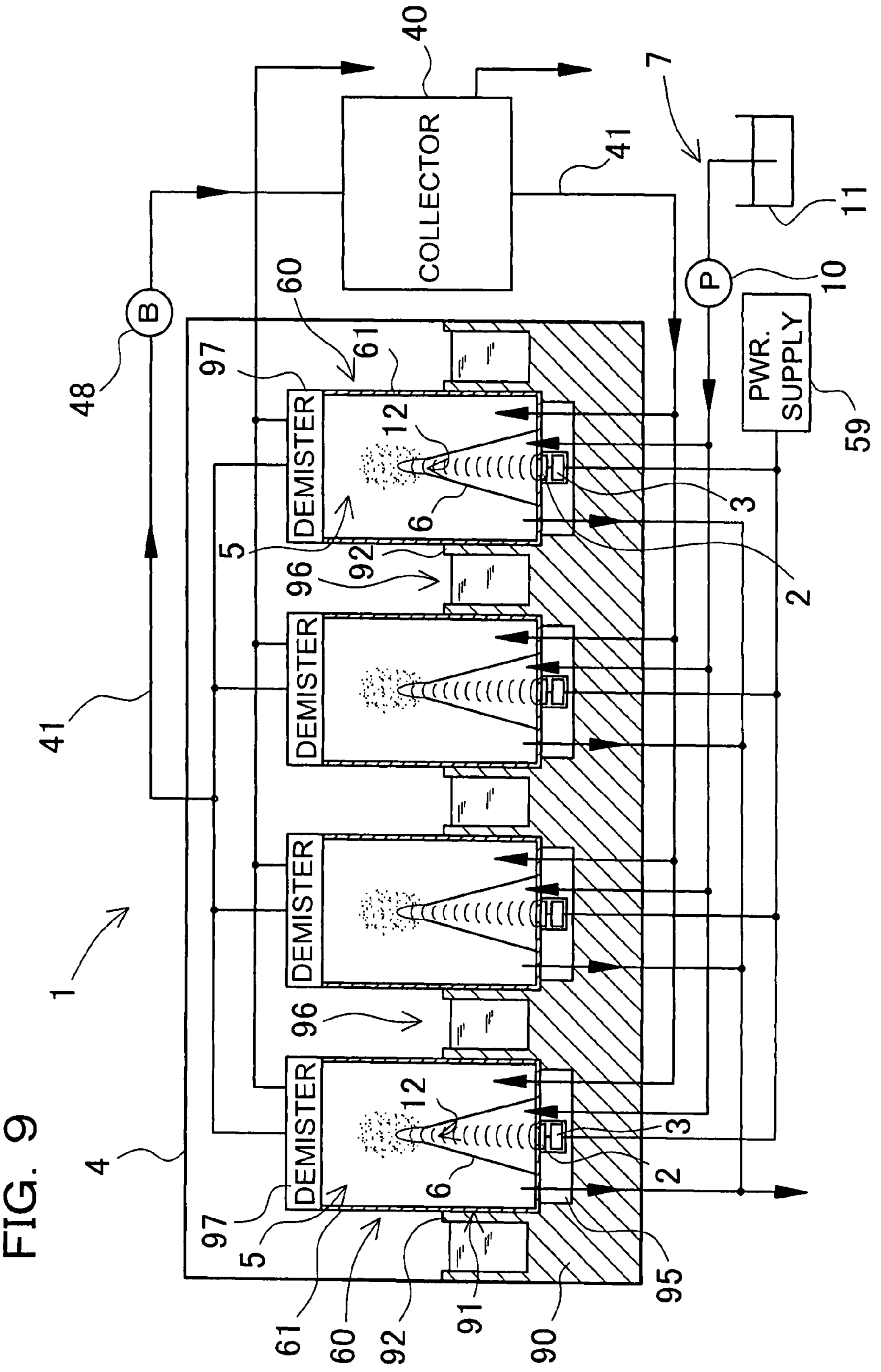
FIG. 9 is a schematic view showing the structure of an ultrasonic separation apparatus according to another embodiment of the present invention.
Figure 10:
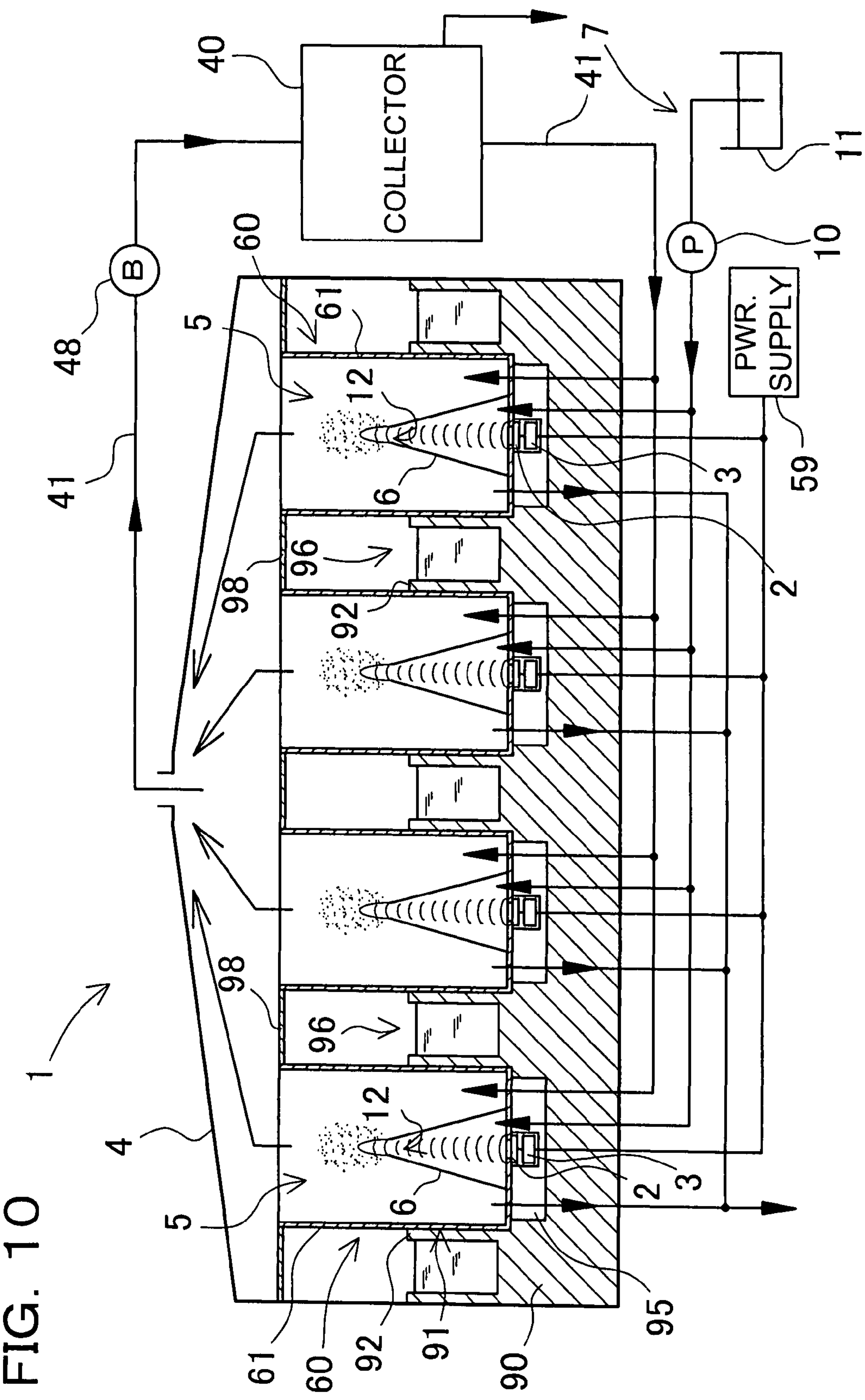
FIG. 10 is a schematic view showing the structure of an ultrasonic separation apparatus according to another embodiment of the present invention.

An ultrasonic separation apparatuses shown in FIGS. 1, 9 and 10 include an ultrasonic atomization device 1 that atomizes the solution into the mist by ultrasonic oscillation, and a collection portion 40 that aggregates and collects the mist that is produced by the ultrasonic atomization device 1. In the illustrated ultrasonic separation apparatuses, the mist produced by the ultrasonic atomization device 1 flows into the collection portion 40 by using carrier gas. In the illustrated ultrasonic separation apparatuses, the ultrasonic atomization device 1 is connected to the collection portion 40 via a circulation duct 41. The carrier gas is transferred to the collection portion 40 from the ultrasonic atomization device 1 by a blower 48, thus, the mist flows into the collection portion 40.

The ultrasonic atomization device 1 includes an atomization chamber 4 that oscillates the undiluted solution at an ultrasonic frequency by using a plurality of ultrasonic oscillators 2 to produce the mist. A plurality of divided chamber sections 5 are disposed in the interior of the atomization chamber 4. The interior of the atomization chamber 4 shown in FIG. 1 is divided into the plurality of divided chamber sections 5 by partitions 8. In the atomization chamber 4 in each of cases shown in FIGS. 9 and 10, unit cases 61 are disposed in the interior of the atomization chamber 4. The unit case 61 defines the divided chamber section 5. In the atomization chamber 4, the ultrasonic oscillators 2 are disposed in the divided chamber sections 5, and the divided chamber sections 5 are supplied with the undiluted solution. The ultrasonic oscillators 2 oscillate the undiluted solution at an ultrasonic frequency to produce the mist. The produced mist is ejected from the divided chamber section 5 by using the carrier gas, and is collected.

Figure 2:
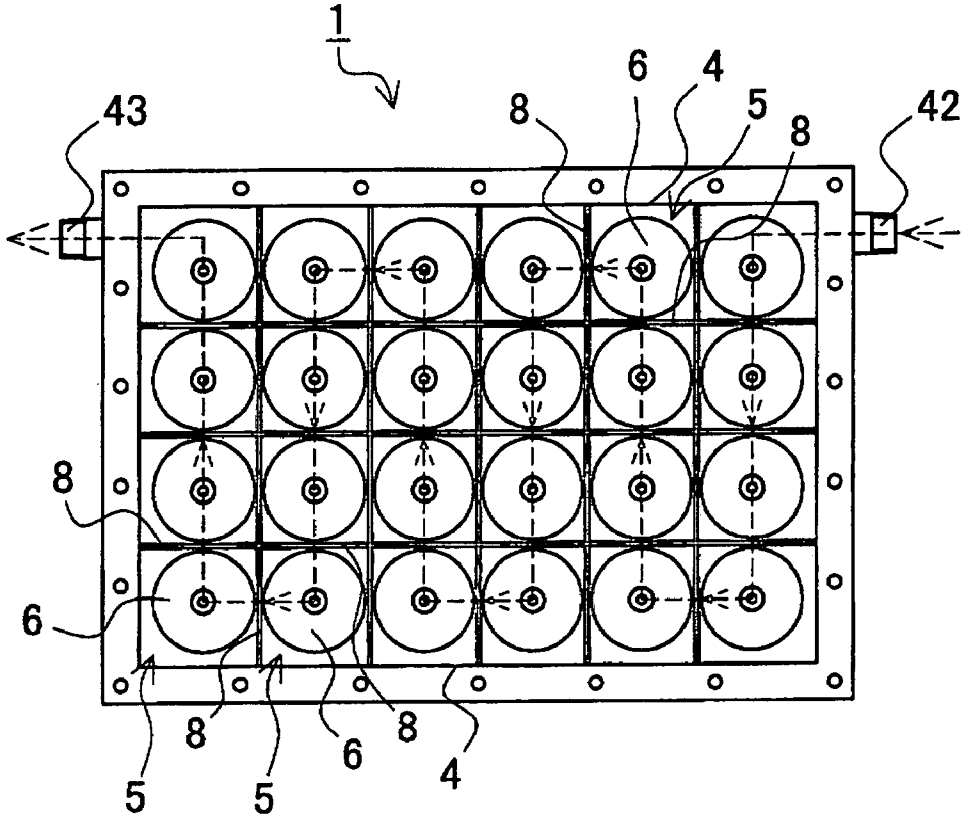
FIG. 2 is a horizontal cross-sectional view of an atomization chamber of an ultrasonic atomization device shown in FIG. 1.

As shown in FIG. 2, the interior of the atomization chamber 4 of the ultrasonic atomization device 1 shown in FIG. 1 is divided in a grid shape into the plurality of divided chamber sections 5 by the partitions 8. The plurality of divided chamber sections 5 that are divided by the partitions 8 are arranged adjacent to each other in length and width directions. The ultrasonic oscillators 2 are arranged on the bottom of the plurality of divided chamber sections 5. As shown in FIGS. 3 to 8, through holes 50A are opened on a bottom plate 50 in the atomization chamber 4. The ultrasonic oscillators 2 are attached into the through holes 50A. In the illustrated atomization chamber 4, the ultrasonic oscillator 2 is disposed in each divided chamber section 5. However, in the atomization chamber, the ultrasonic oscillators are not necessarily disposed in all the divided chamber sections.

The ultrasonic oscillators 2 are disposed to be fastened to the through holes 50A of the bottom plate 50. The illustrated ultrasonic atomization device 1, a connection unit 57 is composed of the ultrasonic oscillator 2 and a high frequency power source 3 that are unitarily coupled to each other, and is fastened to the bottom plates 50. The connection unit 57 includes a casing 58 that accommodates electronic components that compose the high frequency power source 3. The ultrasonic oscillator 2 is arranged on the upper surface of the casing 58. Terminals of the ultrasonic oscillator 2 are connected to the high frequency power source 3. The ultrasonic oscillator 2 oscillates at an ultrasonic frequency by electric power that is supplied from the high frequency power source 3. The high frequency power source 3 is connected to the ultrasonic oscillator 2 via lead wire lines 27, and supplies high frequency output to the ultrasonic oscillator 2. In the connection unit 57, the electronic components that compose the high frequency power source 3 are disposed on the bottom of the casing 58, and are buried in an insulating resin member 56 such as urethane resin and phenol resin by potting. In the illustrated connection unit 57, the casing 58 is connected and fastened in place on the bottom plate 50 at the both ends of the casing 58 by fasteners 46. However, not in the form of the connection unit, the ultrasonic oscillator may be fastened to the bottom plate, and the high frequency power source may be disposed outside. In this case, the ultrasonic oscillator is not necessarily watertightly attached. In addition, in the illustrated connection unit 57 shown, a power cord 76 that supplies electric power to the high frequency power source 3 is drawn out from the casing 58. Although not illustrated, this power cord is connected to a power supply, thus, electric power is supplied to the high frequency power source.

Figure 3:
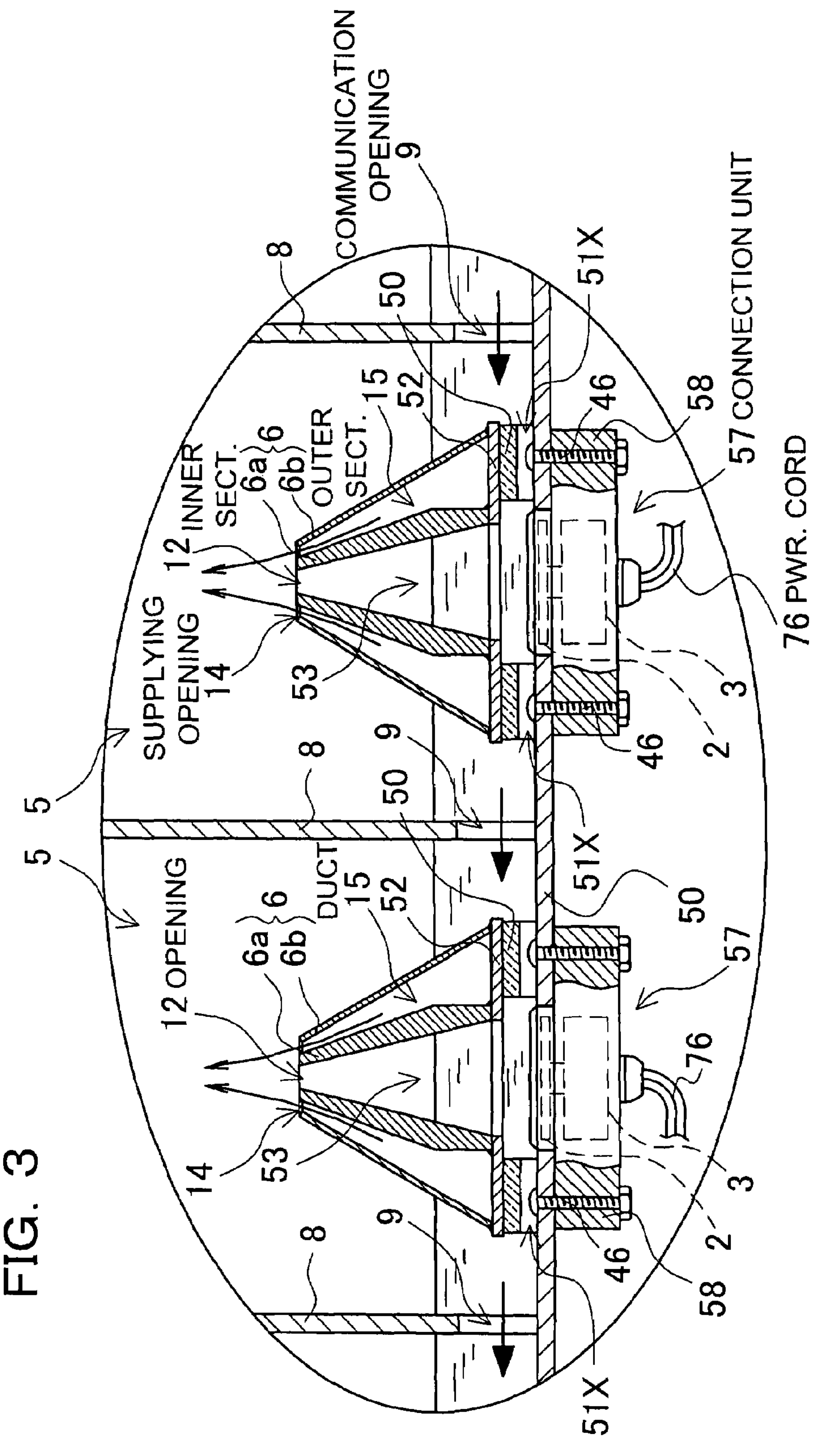
FIG. 3 is a cross-sectional view of the atomization chamber taken along a line A-A shown in FIG. 2.

The undiluted solution is supplied to the interior of the atomization chamber 4 through a feed mechanism 7. The atomization chamber 4 is connected to the feed mechanism 7 of the undiluted solution shown in FIG. 1. This feed mechanism 7 supplies the undiluted solution to the interior of the divided chamber section 5. The illustrated feed mechanism 7 is composed of a solution pump 10 and a solution tank 11. In the illustrated atomization chamber 4, an undiluted solution supply tube 42 is connected to one side of the atomization chamber 4, and an undiluted solution ejection tube 43 is connected to the other side. The atomization chamber 4 is configured to pass the undiluted solution that is supplied from the supply tube 42 through the interior of the atomization chamber 4 and to then eject the undiluted solution from the ejection tube 43. As shown in FIG. 3, the undiluted solution that is supplied to the atomization chamber 4 fills the bottom of each divided chamber section 5, thus, the ultrasonic oscillator 2 that is disposed in each divided chamber section 5 is immersed in the undiluted solution. In the atomization chamber 4, in order to supply the undiluted solution to the interiors of all the divided chamber sections 5, a communication opening 9 is opened on the partition 8 that defines the boundary between the divided chamber sections 5 adjacent to each other. As shown in FIG. 3, the communication opening 9 is opened on the lower end of the partition 8 that is located between the divided chamber sections 5 adjacent to each other. A plurality of the divided chamber sections 5 that are arranged in the length and width directions are configured so that the undiluted solution that is supplied to the atomization chamber 4 can move through the communication opening 9 between the divided chamber sections 5 adjacent to each other. In the illustrated communication opening 9, the upper end of the opening is located above a liquid surface level of the undiluted solution that is supplied to the divided chamber sections 5. However, the communication opening can be opened so that the upper end of the opening is located higher than the liquid surface level.

In addition, in the atomization chamber 4 shown in FIG. 2, as shown by a dashed line in this Figure, a plurality of the divided chamber sections 5 are connected in series through the communication openings 9. In this atomization chamber 4, a plurality of the divided chamber sections 5 are connected through the communication openings 9 so that a single-stroke line runs from the supply tube 42 as a undiluted solution supply port toward the ejection tube 43 as an ejection port. In this structure, since the undiluted solution that is supplied from the supply tube 42 flows along the single stroke line and is ejected from the ejection tube 43, it is possible to provide an advantage that the entire supplied undiluted solution can flow and be atomized without partial stagnation. However, in the atomization chamber, a plurality of the divided chamber sections are not necessarily connected in series through the communication openings. A plurality of divided chamber sections may be connected through a plurality of flow paths.

In addition, in the illustrated atomization chamber 4, tubelike members 6 are disposed above the ultrasonic oscillators 2. The tubelike member 6 has an opening 12 that discharges the undiluted solution that is oscillated at an ultrasonic frequency by the ultrasonic oscillator 2 to produce the mist. The tubelike member 6 is arranged in the bottom of the divided chamber section 5 and above the ultrasonic oscillator 2. The tubelike member 6 efficiently discharges the mist from the solution that is oscillated at an ultrasonic frequency by the ultrasonic oscillator 2. The tubelike member 6 has a tapered sleeve shape like a truncated cone that has an opening 12 that is opened at the top end of the tubelike member 6. Additionally, the illustrated tubelike member 6 includes an inner tubelike section 6*a*, and an outer tubelike section 6*b* that is located outside of the inner tubelike section 6*a*. A duct 15 is disposed between the inner and outer tubelike sections 6*a* and 6*b*. A ring plate 52 is attached to the bottom end of the duct 15. The duct 15 provides a supplying opening 14 that is opened around the opening 12 at the upper end of the tubelike member 6. Thus, the carrier gas that is supplied to the duct 15 is discharged through the supplying opening 14. The tubelike member 6 is configured to be attached to the atomization chamber 4 so that the carrier gas that is supplied to the duct 15 does not leak. The illustrated tubelike member 6 is connected and fastened to the bottom plate 50 of the atomization chamber 4 via the connecting ring 51 of rubber-like packing. The illustrated tubelike member 6 includes connection rods 44 that protrude from the bottom of the ring plate 52. The connection rods 44 pass through the connection ring 51 and the bottom plate 50, and thus fasten the tubelike member 6. The illustrated connection rod 44 has a male threaded portion on its surface. The connection rods 44 pass through through hole portions 51B of the connecting ring 51 and the connection holes 50C of the bottom plate 50. Nuts 45 are screwed into the ends of the connection rods 44. Thus, the tubelike member 6 is fastened onto the bottom plate 50. Moreover, in the tubelike member 6, inlet portions 51X are disposed in the connection ring 51 so that the undiluted solution that is supplied to the divided chamber section 5 can flow into an atomization area 53 that is located inside the lower end of the tubelike member 6 and above the ultrasonic oscillator 2.

Figure 4:
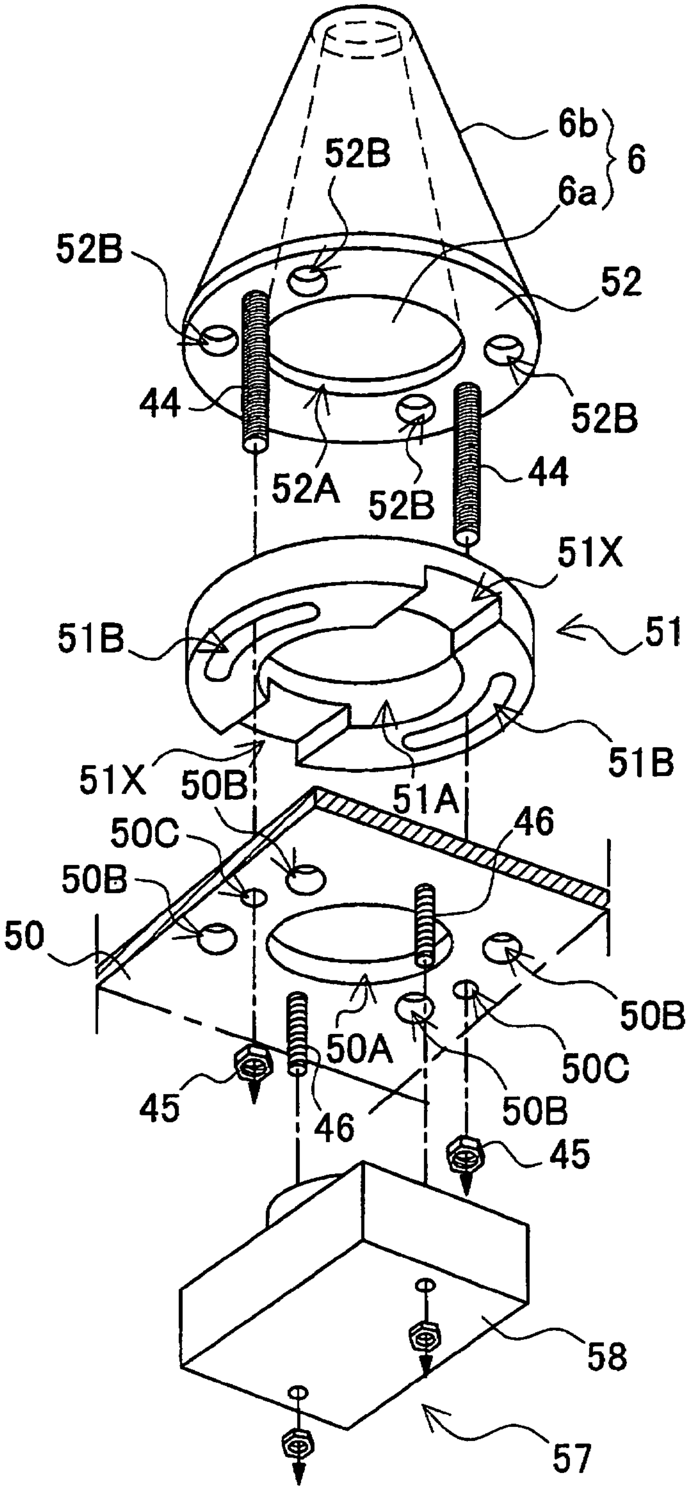
FIG. 4 is an exploded perspective view showing the structure that connects a tubelike member to a portion of a bottom plate.
Figure 5:
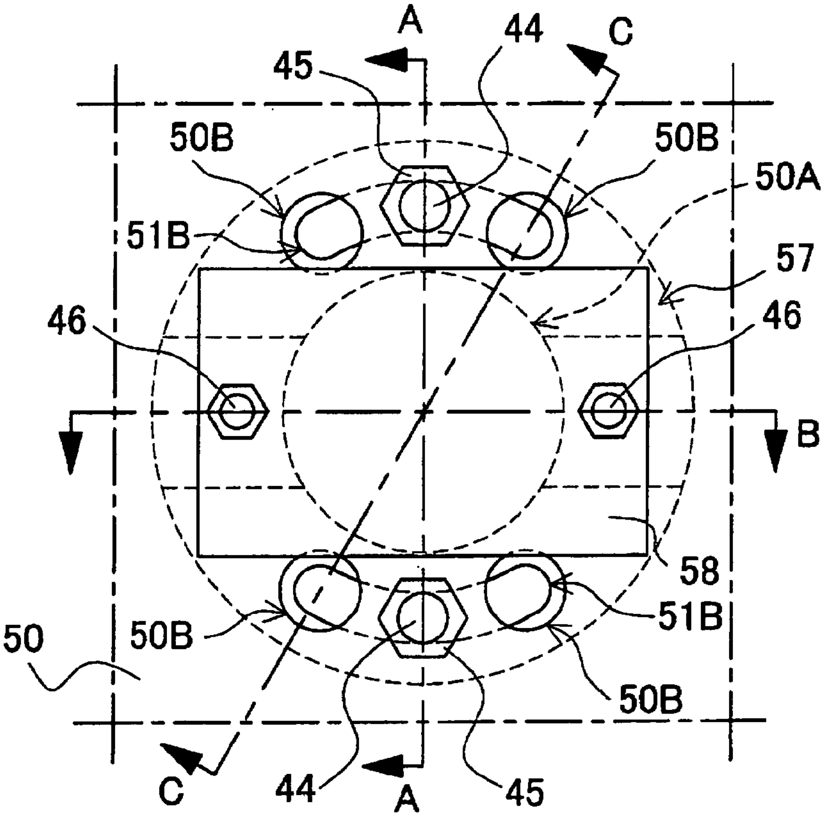
FIG. 5 is a bottom view of a divided chamber section of the ultrasonic atomization device shown in FIG. 1.
Figure 6:
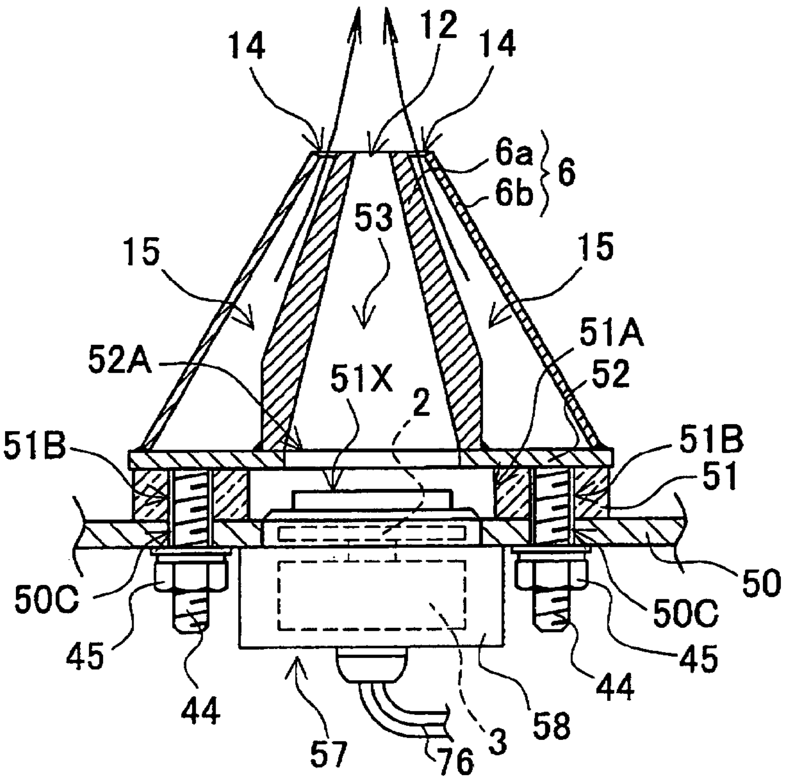
FIG. 6 is a cross-sectional view showing the connection structure between the tubelike member and the bottom plate corresponding to the cross-sectional view taken along the line A-A shown in FIG. 5.
Figure 7:
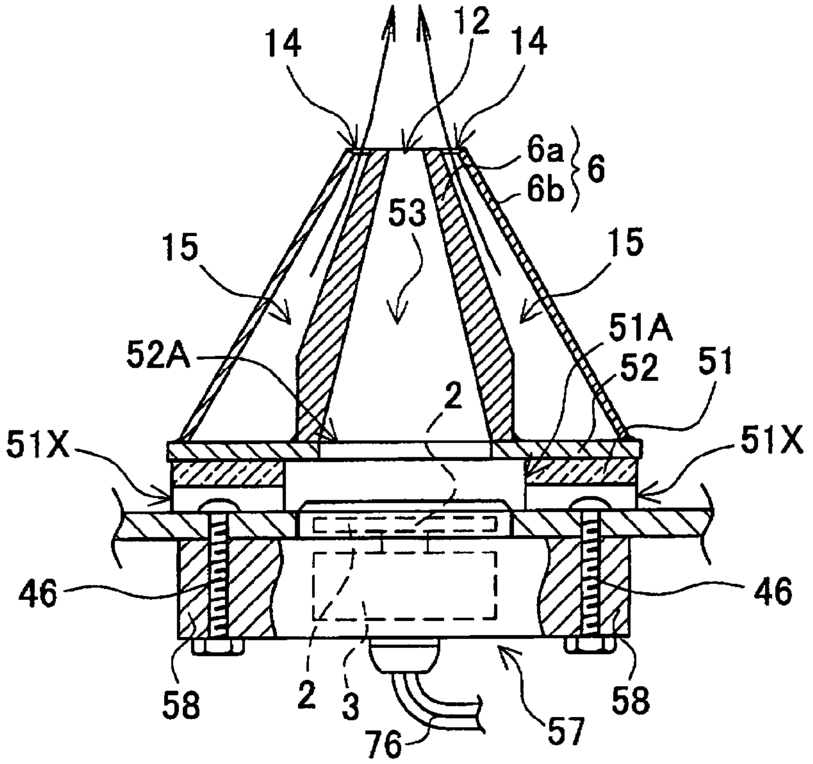
FIG. 7 is a cross-sectional view showing the connection structure between the tubelike member and the bottom plate corresponding to the cross-sectional view taken along the line B-B shown in FIG. 5.
Figure 8:
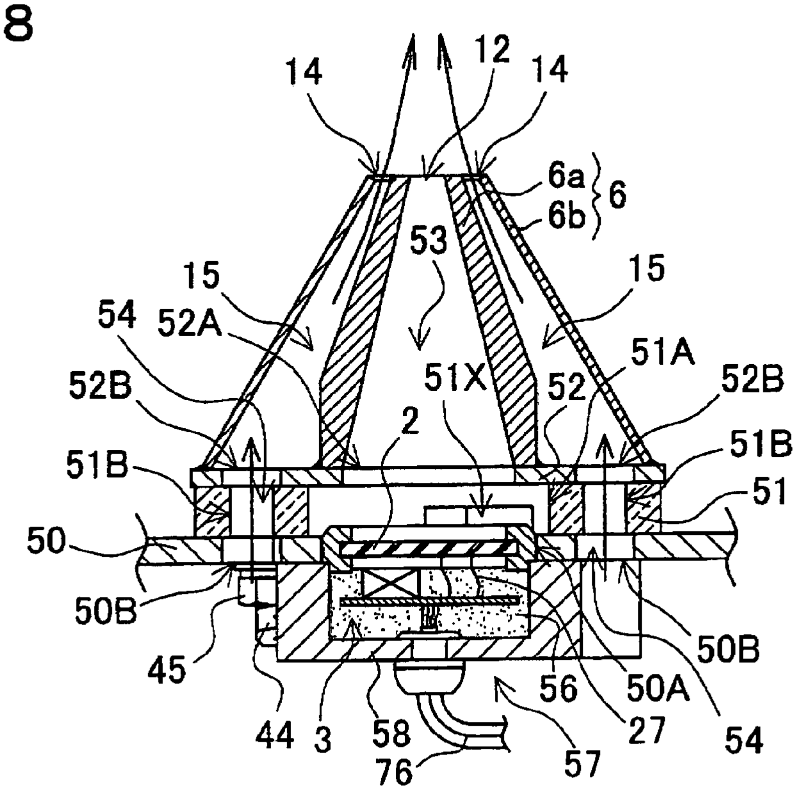
FIG. 8 is a cross-sectional view showing the connection structure between the tubelike member and the bottom plate corresponding to the cross-sectional view taken along the line C-C shown in FIG. 5.

The connection ring 51 is packing made of rubber that provides intimate contact between the tubelike member 6 and the bottom plate 50. The connection ring 51 has a center hole 51A that is opened in the center of the connection ring 51, and arc-shaped through openings 51B on opposite sides of the center hole 51A. The through openings 5B communicate gas flow openings 52B of the ring plate 52 to gas flow openings 50B of the bottom plate 50, and also serve as through openings that accommodate the connection rods 44 that are arranged on the ring plate 52 so that the connection rods 44 pass through the through openings 51B. As shown in FIG. 4, the ring plate 52 of the tubelike member 6 has the gas flow openings 52B that are opened on the respective both sides of the connection rods 44 that protrude from the bottom of the ring plate 52. Thus, the through openings 51B of the connection ring 51 are opened in the locations that are opposed to the connection rods 44, and the gas flow openings 52B that are located in the respective both sides of the connection rods 44. However, the connection ring can separately have through openings to which the connection rods are inserted, and through openings that are opposed to the gas flow openings. In addition, the connection ring 51 is provided with the inlet portions 51X that lead the undiluted solution that is supplied to the divided chamber section 5 into the interior the center hole 51A. In the connection ring 51 shown in FIG. 4, recessed portions are disposed on opposite sides of the center hole 51A on the bottom that are located between the through openings 51B, and extend radially from the center hole 51A to the peripheral surface of the connection ring 51 to serve as the inlet portions 51X for the undiluted solution. The inlet portions that are composed of the recessed portions can be arranged on upper surface side of the connection ring. In addition, through holes can be arranged to radially pass through the connection ring to serve as the inlet portions.

In the tubelike member 6, the ultrasonic oscillator 2 emits ultrasonic waves toward the opening 12 to oscillate the undiluted solution that supplied to the atomization area 53 at an ultrasonic frequency, thus, the mist is produced and is discharged through the opening 12. The illustrated ultrasonic oscillator 2 emits ultrasonic waves upward. Thus, the tubelike member 6 is fastened above the ultrasonic oscillator 2 in a vertical orientation. In the tubelike member 6, the waves by the ultrasonic oscillator 2 pass through the center hole 51A of the connection ring 51, and the center hole 52A of the ring plate 52, and travel inside the inner tubelike section 6*a*. Thus, the undiluted solution in the atomization area 53 is oscillated at an ultrasonic frequency, as a result, the mist is produced. This tubelike member 6 efficiently discharges the mist from the undiluted solution that is oscillated at an ultrasonic frequency by the ultrasonic oscillator 2. The illustrated tubelike member 6 has a conical horn that is tapered toward the upper end. Alternatively, however, the tubelike member can be an exponential horn with its interior shape being exponentially curved. The tubelike member 6 such as a conical horn and an exponential horn is featured in that the tubelike member allows the ultrasonic oscillation to be effectively transmitted inside the tubelike member and the solution can be atomized into the mist efficiently. In this invention, however, the tubelike member may also be cylindrical, elliptical or polygonal.

The internal shape of the lower end of the tubelike member 6 is made larger than the profile of the ultrasonic oscillator 2 so that the ultrasonic oscillation can be efficiently transmitted inside, and the ultrasonic waves rise along the interior surface of the tubelike member. As shown in FIGS. 3 to 6, in the structure in which the ultrasonic oscillator 2 is arranged in the lower part of the tubelike member 6, the internal shape of the lower end of the inner tubelike section 6*a* is made larger than the profile of the ultrasonic oscillator 2. For example, the inner diameter of the lower end of the inner tubelike section 6*a* is 100 to 150%, preferably 150 to 300%, of the outer diameter of the ultrasonic oscillator 2.

The size of the opening 12 of the tubelike member 6 specifies, when the solution that is supplied to the tubelike member 6 protrudes from the opening 12 as a liquid column P, the width of the liquid column P, i.e., the cross-sectional area of the liquid column P. Since, in the case of a liquid column with a large cross-sectional area, its surface area is large, the mist can be efficiently produced in the gas by ultrasonic oscillation. However, if the cross-sectional area is too large, the ultrasonic oscillator requires large energy to produce the mist from the surface of the liquid column. Conversely, if the cross-sectional area is small, the ultrasonic oscillator requires small energy to produce the mist from the surface of the liquid column, but, since the surface area of the liquid column is small, the mist production efficiency by ultrasonic oscillation decreases. Thus, the size of the opening 12 of the tubelike member 6 is designed to obtain an optimal value in accordance with factors such as the size, output and frequency regarding the ultrasonic oscillator 2.

The mist that is produced in the opening 12 of the tubelike member 6 is transferred by using the carrier gas, and is ejected from the divided chamber section 5. The supplying opening 14 is arranged on the bottom part of the divided chamber section 5. The supplying opening 14 supplies the carrier gas to the mist that is discharged from the tubelike member 6. In the illustrated tubelike member 6, the duct 15 for the carrier gas is arranged between the inner and outer tubelike sections 6*a* and 6*b*. The upper end of the duct 15 serves as the supplying opening 14 that serves as a discharging opening that discharges the carrier gas. The supplying opening 14 is opened in a slit shape around the upper end of the tubelike member 6. The slit-shaped supplying opening 14 discharges the gas in a ring shape. The solution is discharged inside the gas that is discharged in a ring shape, thus, the mist is discharged from the surface of the discharged solution. Since the thus-configured tubelike member 6 supplies fresh gas to the surface of the liquid column P that protrudes from the opening, it is possible to efficiently produce the mist from the surface of the liquid column P. This is because the mist is produced in the carrier gas that has a less concentrated solution.

In addition, the illustrated atomization chamber 4, a gas feed path 54 is arranged to supply the carrier gas to the duct 15 that is disposed in the tubelike member 6. The gas feed path 54 communicates the duct 15 of the tubelike member 6 to a gas supply chamber 55 that is disposed under the bottom plate 50 of the atomization chamber 4. The illustrated gas feed path 54 is arranged to connect the gas flow openings 52B that are opened on the ring plate 52 that is attached to the lower end of the duct 15, through openings 51B that are opened on the connection ring 51, and the gas flow opening 50B that are opened on the bottom plate 50 of the atomization chamber 4 to each other. The connection ring 51 of rubber-like packing couples the ring plate 52 and the bottom plate 50 of the tubelike member 6 to each other in an intimate contact state so that the carrier gas can be supplied from the gas supply chamber 55 to the duct 15 not to leak. The gas supply chamber 55 is connected to a carrier gas supply source, and is supplied with the carrier gas. As shown by an arrow in FIG. 8, the carrier gas that is supplied to the gas supply chamber 55 passes the gas feed path 54 from the gas flow opening 50B of the bottom plate 50, and is supplied to the duct 15 of the tubelike member 6, and is then ejected from the supplying opening 14. In the separation apparatus shown in FIG. 1, the ejection side of the collection portion 40 is connected to the gas supply chamber 55. Thus, the carrier gas that is ejected from the collection portion 40 is supplied to the atomization chamber 4. This structure can circulate the carrier gas and can separate the mist. However, the separation apparatus can have a gas compression source that is connected to the gas supply chamber to forcedly blow gas to the duct of the tubelike member without circulating carrier gas.

The thus-configured tubelike member 6 discharges the carrier gas from the supplying opening 14 that is arranged around the periphery of the opening 12. Therefore, the tubelike member 6 has an advantage that supplies the carrier gas to the mist that is produced in the opening 12 of the tubelike member 6, and thus can efficiently ejects the mist outside the divided chamber section 5. However, in the ultrasonic separation apparatus according to the present invention, the supplying opening is not necessarily arranged around the periphery of the opening of the tubelike member. For example, the supplying opening can be arranged to be opened in the lower part of the divided chamber section to supply the carrier gas through the opening of the tubelike member to the mist that is produced in the gas so that the mist is ejected from the divided chamber section.

The ultrasonic atomization devices 1 shown in FIGS. 9 and 10 include a plurality of ultrasonic units 60, and a base 90 that detachably mounts the ultrasonic units 60. In the illustrated ultrasonic atomization device 1, the plurality of ultrasonic units 60 and the bases 90 are disposed in the tightly-sealed atomization chamber 4. In the ultrasonic separation apparatus, the plurality of ultrasonic units 60 are mounted to the base 90, and the undiluted solution is supplied to each ultrasonic unit 60 from the base 90. The supplied solution is atomized into the mist in the ultrasonic unit 60, and is ejects from the atomization chamber 4. The ejected mist is collected in the collection portion 40, thus, the target material containing liquid is collected.

Figure 11:
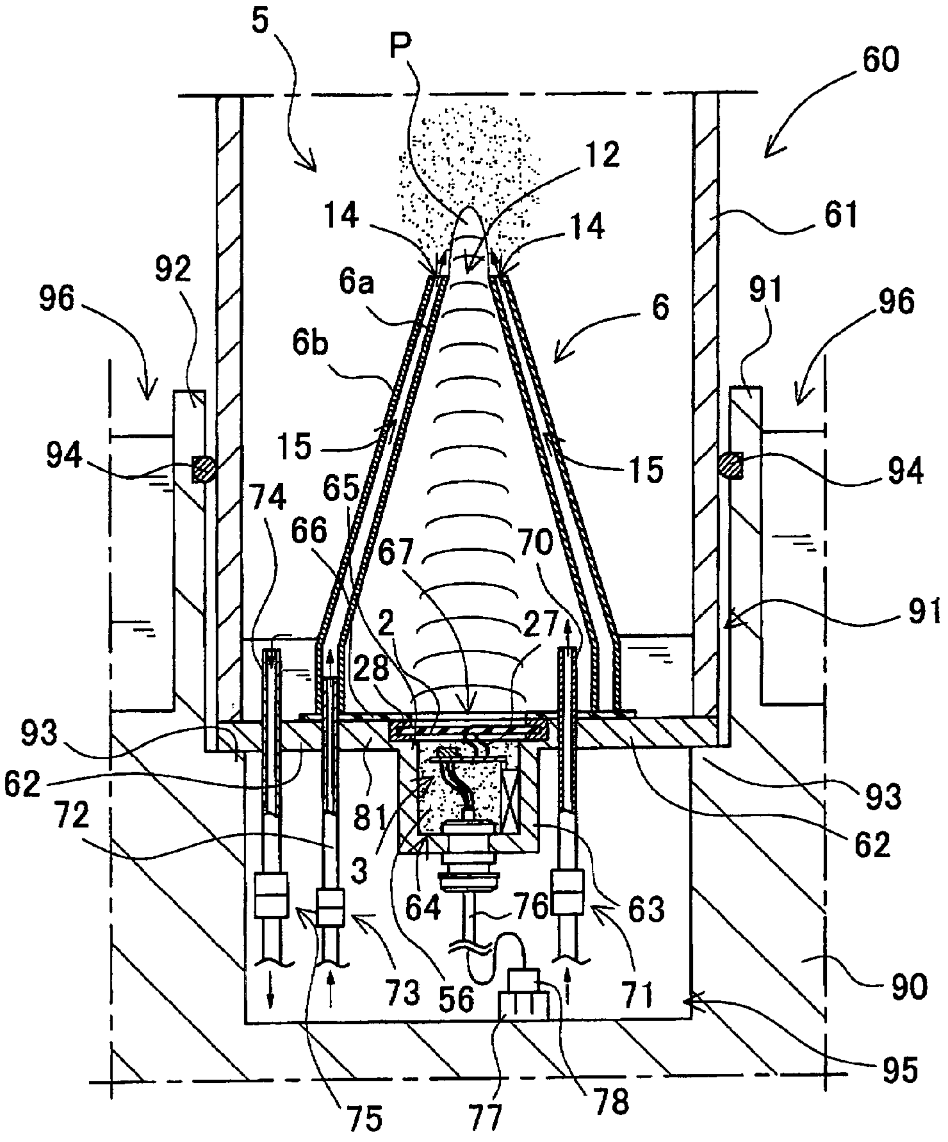
FIG. 11 is a cross-sectional view showing an exemplary ultrasonic unit.
Figure 12:
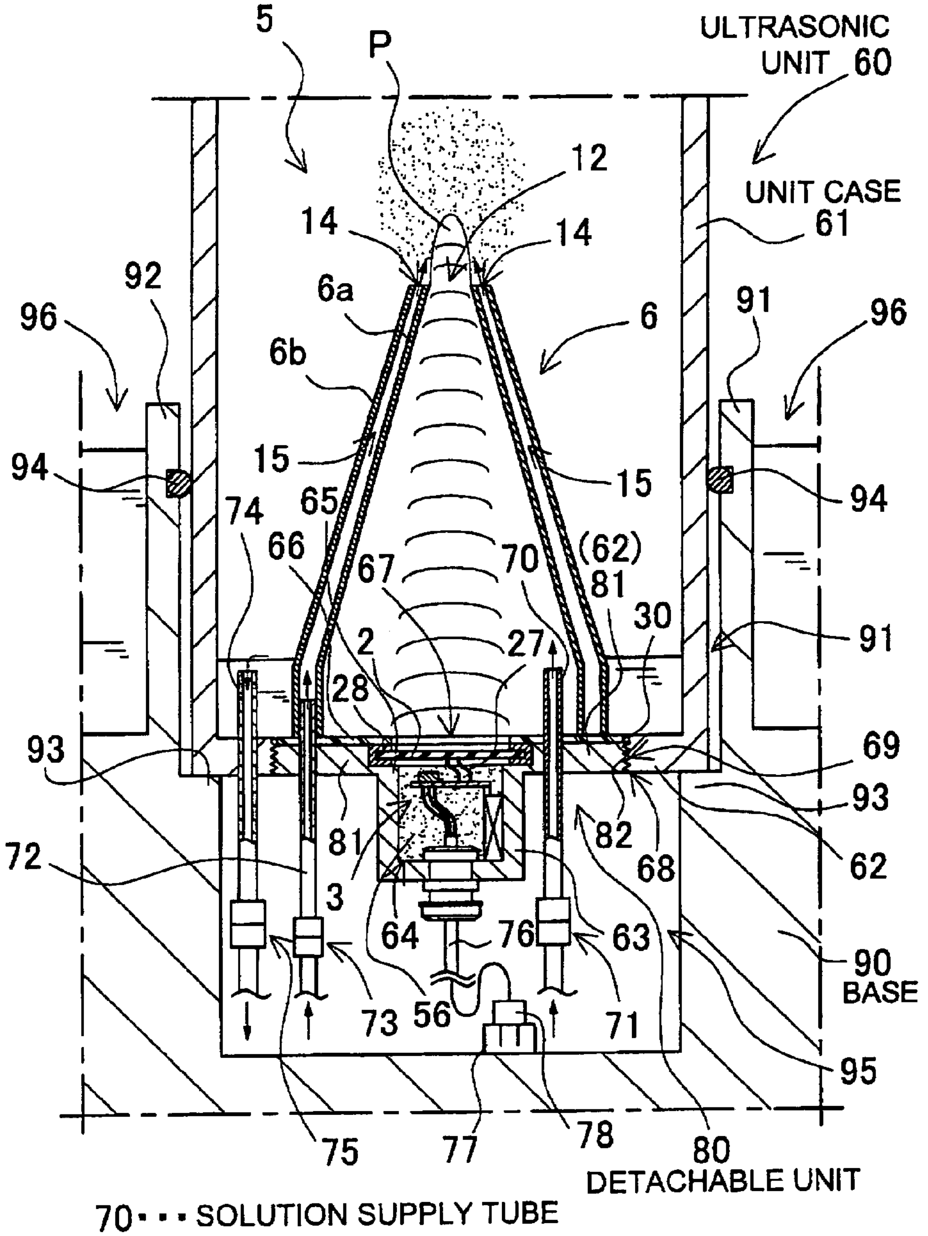
FIG. 12 is a cross-sectional view showing another exemplary ultrasonic unit.
Figure 13:
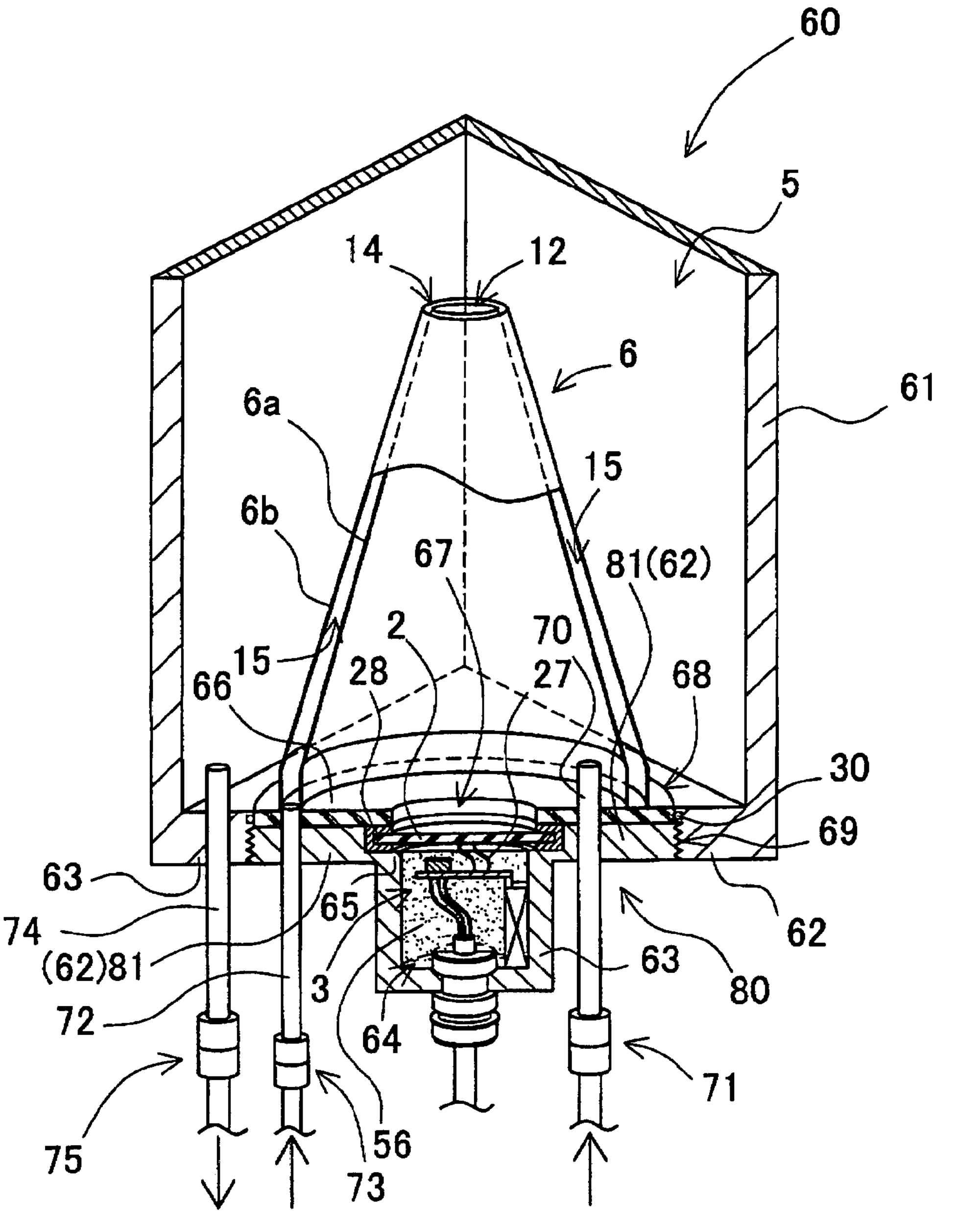
FIG. 13 is a cross-sectional perspective view of the ultrasonic unit shown in FIG. 12.

As shown in FIGS. 11 to 13, the ultrasonic unit 60 serves as the divided chamber section 5, and includes a unit case 61, the ultrasonic oscillator 2, and the tubelike member 6. The undiluted solution is supplied to the bottom of the unit case 61. The ultrasonic oscillator 2 is arranged on the bottom of unit case 61. The tubelike member 6 has the opening 12 that discharges the undiluted solution that is oscillated at an ultrasonic frequency by the ultrasonic oscillator 2 to produce the mist.

The unit case 61 has a prism shape with a closed bottom, and is detachably mounted in a predetermined position of the base 90. The illustrated unit case 61 has a prism shape with a square horizontally cross-section. However, the prism-shaped unit case can have a polygonal shape such as triangle and polygon more than five point polygon, a circle, or an ellipse in a cross section. The bottom of the prism-shaped unit case 61 is closed by a bottom plate 62. In the unit case 61 with the closed bottom, the ultrasonic oscillator 2 is fastened to the bottom of the unit case 61, and the tubelike member 6 is arranged above the ultrasonic oscillator 2.

The ultrasonic oscillator 2 is fastened to the bottom of the unit case 61. The terminals that are disposed on the bottom of the ultrasonic oscillator 2 that is fastened to the bottom of the unit case 61 are connected to the high frequency power source 3. The ultrasonic oscillator 2 is oscillated at an ultrasonic frequency by electric power that is supplied from the high frequency power source 3. The high frequency power source 3 is connected to the ultrasonic oscillator 2 via the lead wire lines 27, and supplies high frequency output to the ultrasonic oscillator 2. In the illustrated ultrasonic unit 60, the electronic components that compose the high frequency power source 3 are accommodated in an accommodation portion 64 that is disposed in the bottom of the unit case 61. The ultrasonic oscillator 2 is fastened in an opening of this accommodation portion 64.

In the unit case 61, the bottom plate 62 as the bottom of the unit case is provided with the accommodation portion 64 that is opened upward. In the illustrated ultrasonic unit 60, the accommodation case 63 is attached to the bottom plate 62 of the unit case 61, and the recessed accommodation portion 64 is defined by the interior of the accommodation case 63. The accommodation case 63 has a cylindrical shape with a closed bottom. In the illustrated ultrasonic unit 60, the bottom plate 62 and the accommodation case 63 are formed unitarily with each other. In the accommodation case 63, the electronic components that compose the high frequency power source 3 are disposed on the bottom of the accommodation portion 64, and are buried in an insulating resin member 56 such as urethane resin and phenol resin by potting. In addition, in order to fasten the ultrasonic oscillator 2 to the opening, a stepped portion 65 is arranged in the inner surface of an opening rim of the accommodation case 63. The ultrasonic oscillator 2 is watertightly attached in the stepped portion 65 by using packing 28. The ultrasonic oscillator 2 that is fastened to this stepped portion 65 is spaced at an interval away from between the insulating resin member 56. The reason is that the ultrasonic oscillator 2 oscillates not in contact with the insulating resin member. The upward opening of the stepped portion 65 is closed by a fastening portion 66 that is fastened to the upper surface of the bottom plate 62. The fastening portion 66 has an opening 67 with the same diameter as the inner diameter of the packing 28, and comes in intimate contact with the upper surface of the packing 28 to watertightly fasten the ultrasonic oscillator 2 to the stepped portion 65. The fastening portion 66 is fastened to the bottom plate 62 by screws. Although, in the aforementioned unit case 61, the accommodation portion 64 accommodates the high frequency power source 3, the high frequency power source can be disposed outside the unit case. In this unit case, the ultrasonic oscillator is not necessarily watertightly attached.

The tubelike member 6 is arranged in the bottom of the unit case 61 and above the ultrasonic oscillator 2. The tubelike member 6 efficiently discharges the mist from the solution that is oscillated at an ultrasonic frequency by the ultrasonic oscillator 2. The tubelike member 6 has a tapered sleeve shape like a truncated cone that has the opening 12 that is opened at the top end of the tubelike member 6. The lower end of the tubelike member 6 is fastened to the bottom plate 62 of the unit case 61. In the illustrated ultrasonic unit 60, the lower end of the tubelike member 6 is closed by bottom plate 62. The solution that is supplied to the unit case 61 is supplied to the interior of the tubelike member 6. In order to supply the undiluted solution to the interior of the tubelike member 6, a solution supply tube 70 is connected to the tubelike member 6 to communicate the interior of the tubelike member 6 to the exterior of the unit case 61. The illustrated solution supply tube 70 passes through the bottom plate 62 of the unit case 61. One end of the solution supply tube 70 is located in the interior of the tubelike member 6, while, the other end is located outside the unit case 61. The solution supply tube 70 is connected to the solution feed mechanism 7 shown in FIGS. 1 and 2. This feed mechanism 7 supplies the undiluted solution to the interior of the tubelike member 6. The illustrated feed mechanism 7 is composed of the solution pump 10 and the solution tank 11. In addition, in the solution supply tube 70 shown in FIGS. 3 to 5, the end that is located outside the unit case 61 is connected to the solution feed mechanism 7 via a detachable connector 71. This connection structure can provide easy, quick and detachable connection of the solution supply tube 70 to the feed mechanism 7.

In the tubelike member 6, the ultrasonic oscillator 2 emits ultrasonic waves toward the opening 12 to oscillate the undiluted solution that supplied to the interior of the tubelike member 6 at an ultrasonic frequency, thus, the mist is produced and is discharged through the opening 12. Similarly to the aforementioned tubelike member, in order to efficiently discharge the mist from the undiluted solution that is oscillated at an ultrasonic frequency by the ultrasonic oscillator, the tubelike member 6 has a conical horn that is tapered toward the upper end. In addition, as shown in FIGS. 11 to 13, the internal shape of the lower end of the tubelike member 6 is made larger than the profile of the ultrasonic oscillator 2 so that the ultrasonic oscillation can be efficiently transmitted inside. Additionally, the size of the tubelike member 6 is designed to obtain an optimal value in accordance with factors such as the size, output and frequency regarding the ultrasonic oscillator 2.

The mist that is produced in the opening 12 of the tubelike member 6 is transferred by using the carrier gas, and is ejected from the unit case 61 as the divided chamber section 5. The supplying opening 14 is disposed in the unit case 61. The supplying opening 14 supplies the carrier gas to the mist that is discharged from the tubelike member 6. The illustrated tubelike member 6 has the supplying opening 14 that serves as a discharging opening that is opened to discharge the carrier gas around the periphery of the opening 12. The illustrated tubelike member 6 also includes the inner tubelike section 6*a*, and the outer tubelike section 6*b* that is located outside of the inner tubelike section 6*a*. The duct 15 is disposed between the inner and outer tubelike sections 6*a* and 6*b*. The duct 15 has the supplying opening 14 that is opened around the opening 12 at the upper end of the tubelike member 6. Thus, the carrier gas that is supplied to the duct 15 is discharged through the supplying opening 14. The supplying opening 14 is opened in a slit shape around the upper end of the tubelike member 6. The slit-shaped supplying opening 14 discharges the gas in a ring shape. The solution is ejected inside the gas that is discharged in a ring shape, thus, the mist is discharged from the surface of the ejected solution. Since the thus-configured tubelike member 6 supplies fresh gas to the surface of the liquid column P that protrudes from the opening, it is possible to efficiently produce the mist from the surface of the liquid column P. This is because the mist is produced in the carrier gas that has a less concentrated solution.

In addition, in the illustrated ultrasonic unit 60, a gas feed tube 72 is arranged to supply the carrier gas to the duct 15 that is disposed in the tubelike member 6. The illustrated gas feed tube 72 passes through the bottom plate 62 of the unit case 61. One end of the gas feed tube 72 is located in the interior of the duct 15, while, the other end is located outside the unit case 61. The gas feed tube 70 is connected to the carrier gas supply source, and is supplied with the carrier gas. In the separation apparatuses shown in FIGS. 9 and 10, the ejection side of the collection portion 40 is connected to the gas feed tube 72. Thus, the carrier gas that is ejected from the collection portion 40 is supplied to the unit case 61. This structure can circulate the carrier gas and can separate the mist. However, the separation apparatus can have a gas compression source that is connected to the gas feed tube to forcedly blow gas to the duct of the tubelike member without circulating carrier gas. In the gas feed tube 72 shown in FIGS. 11 to 14, the end that is located outside the unit case 61 is connected to the carrier gas supply source via a detachable connector 73. This connection structure can also provide easy, quick and detachable connection of the gas feed tube 72 to the supply source.

The thus-configured tubelike member 6 discharges the carrier gas from the supplying opening 14 that is arranged around the periphery of the opening 12. Therefore, the tubelike member 6 has an advantage that supplies the carrier gas to the mist that is produced in the opening 12 of the tubelike member 6, and thus can efficiently ejects the mist outside the unit case 61. However, in the ultrasonic separation apparatus according to the present invention, the supplying opening is not necessarily arranged around the periphery of the opening of the tubelike member. For example, the supplying opening can be arranged in the lower part of the unit case to discharges the solution that is atomized into the mist in the gas outside from the opening of the tubelike member.

In addition, the unit case 61 is configured to eject the solution that overflows and is ejected from the opening 12 of the upper end of the tubelike member 6 outside the unit case 61. In order to eject the solution that is collected on the periphery of the tubelike member 6, the illustrated unit case 61 has a solution ejection tube 74 that communicates the interior side and the exterior side of the unit case 61. The solution ejection tube 74 passes through the bottom plate 62 of the unit case 61. One end of the solution ejection tube 74 is located in the bottom pert of the unit case 61 outside the tubelike member 6, while, the other end is located outside the unit case 61. In the solution ejection tube 74 shown in FIGS. 3 to 5, the end that is located outside the unit case 61 is connected to solution ejection mechanism (not shown) via a detachable connector 75.

In addition, in the illustrated ultrasonic unit 60, the power cord 76 that supplies electric power to the high frequency power source 3 is drawn out from an accommodation casing 63. This power cord 76 is connected to a power supply outside the unit case 61. The illustrated base 90 is provided with a receptacle 77 that connects the power cord 76 to a power supply 59. A connecting plug 78 of the power cord 76 is connected to the receptacle 77, thus, the ultrasonic unit 60 is mounted to the power supply 59 and as a result is supplied with electric power from the power supply 59. This structure has an advantage that the high frequency power source 3 can be very easily, electrically connected to the power supply 59.

In the ultrasonic unit 60 shown in FIG. 11, the ultrasonic oscillator 2 and the tubelike member 6 are fastened to the bottom plate 62 of the unit case 61. In the thus-configured ultrasonic unit 60, the unit case 61 can be replaced, thus, the ultrasonic oscillator 2 and the tubelike member 6 can be replaced. In addition, in the ultrasonic unit 60 shown in FIGS. 12 and 13, a detachable unit 80 is composed of the ultrasonic oscillator 2 and the tubelike member 6 that are unitarily coupled to each other, and the detachable unit 80 is detachably attached to the unit case 61. In the ultrasonic unit 60, only the detachable unit 80 can be replaced without replacement of the unit case 61, thus, the ultrasonic oscillator 2 and the tubelike member 6 can be replaced.

The detachable unit 80 is detachably attached to a circular connection opening 68 that is opened on the bottom plate 62 of the unit case 61. In the bottom plate 62, a female-threaded portion 69 is formed on the inner peripheral surface of the connection opening 68. A male-threaded portion 82 that is formed on the outer peripheral surface of the detachable unit 80 is screwed into the female-threaded portion 69. The detachable unit 80 has a circular connection plate 81 that serves as the bottom plate 62 of the unit case 2. The external shape of the circular connection plate 81 can be inserted into the connection opening 68. The male-threaded portion 82 is formed on the outer peripheral surface of the connection plate 81. The male-threaded portion 82 of the connection plate 81 is screwed into the female-threaded portion 69 of the connection opening 68, thus, the detachable unit 80 is mounted to the unit case 61. Since the connection opening 68 is communicated to the interior of the unit case 61, it is necessary to liquid-tightly mount the detachable unit 80 to the bottom plate 62 of the unit case 61. For this reason, an O-ring 30 is interposed between the inner surface of the connection opening 68 of the bottom plate 62, and the outer peripheral surface of the detachable unit 80. The O-ring 30 provides liquid tight connection between the connection opening 68 and the detachable units 80, thus, the connection plate 81 of the detachable unit 80 liquid-tightly closes the connection opening 68.

Figure 14:
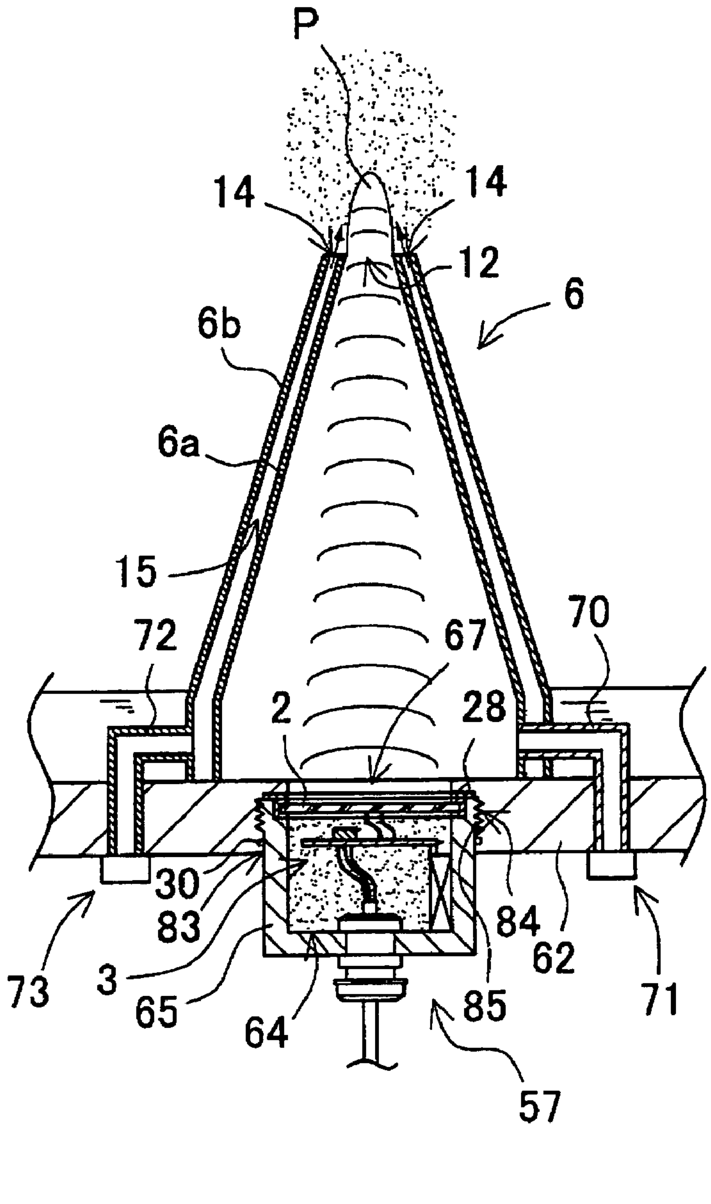
FIG. 14 is a cross-sectional view showing another exemplary connection structure of the ultrasonic oscillator.

In addition, in the unit case, the ultrasonic oscillator 2 can be fastened to the bottom plate 62 as shown in FIG. 14. In the unit case shown in this Figure, an accommodation case 65 that is configured to accommodate the ultrasonic oscillator 2 and the high frequency power source 3 is detachably mounted to the bottom plate 62 as the connection unit 57. In the illustrated accommodation case 65, the electronic components that compose the high frequency power source 3 are accommodated in the accommodation portion 64 that is opened upward, and are buried in the insulating resin member 56. The ultrasonic oscillator 2 is arranged on the opening rim. The accommodation case 65 is detachably mounted to a recessed connection portion 83 that is opened downward on the lower side of the bottom plate 62. A female-threaded portion 84 is formed on the inner surface of the recessed connection portion 83. The external shape of the accommodation case 65 can be inserted into the recessed connection portion 83. The male-threaded portion 85 is formed on the upper part outer periphery of the accommodation case 65 to be screwed into the female-threaded portion 84 of the recessed connection portion 83 The male-threaded portion 85 is screwed into the female-threaded portion 84, thus, the accommodation case 65 is mounted to the recessed connection portion 83. The bottom of the recessed connection portion 83 is opened as an opening 67. The ultrasonic oscillator 2 is exposed inward of the tubelike member 6 through this opening 67. Since the recessed connection portion 83 is communicated to the interior of the tubelike member 6, it is necessary to water-tightly mount the accommodation unit 65 to the recessed connection portion 83. For this reason, the O-ring 30 is interposed between the inner surface of the recessed connection portion 83, and the outer periphery of the accommodation case 65, and the recessed connection portion 83 and the accommodation case 65 are water-tightly coupled to each other. Since the ultrasonic oscillator 2 and the high frequency power source 3 are disposed in the accommodation case 65, the illustrated connection unit 57 has an advantage that can easily replace the ultrasonic oscillator 2 and the high frequency power source 3 by replacing only the connection unit 57.

A plurality of recessed mounting portions 91 are formed on the upper surface of the base 90 to detachably mount the unit cases 61 of a plurality of the ultrasonic units 60. The recessed mounting portion 91 is a recessed portion that can mount the lower part of the unit case 61. The lower part of the unit case 61 is fitted to this recessed portion, and thus can be held in a predetermined position. The illustrated base 90 is provided with cylindrical partitions 92 that fit the outer periphery of the unit case 61. The recessed mounting portion 91 is disposed inside the partition 92. A stepped portion 93 is arranged on the inner surface of the recessed mounting portion 91. This stepped portion 93 can support the bottom of the unit case 61, and thus mounts the unit case 61 in the predetermined position. In addition, the illustrated recessed mounting portion 91 includes an elastic support member 94 on the inner surface of the partition 92 to mount the unit case 61 without deviated from the predetermined position. The illustrated elastic support member 94 is packing formed of a rubber-like elastic material, and comes in intimate contact with the inner surface of the recessed mounting portion 91, and the external surface of the unit case 61 to hold the unit case 61 in the predetermined position. However, the elastic support member is not necessarily required.

In addition, in the recessed mounting portion 91, an accommodation portion 95 is disposed under the stepped portion 93 to accommodate connection parts that can be connected to the ultrasonic unit 60. This accommodation portion 95 accommodates pipes and wire lines that supply the solution, the carrier gas, and electric power to the ultrasonic unit 60, or eject the solution. In the interior of the accommodation portion 65, the solution supply tube 70 of the ultrasonic unit 60 that is mounted to the recessed mounting portion 91 is connected to the feed mechanism 7. The gas supply tube 72 of the ultrasonic unit 60 is connected to the carrier gas supply source. The high frequency power source 3 is connected to the power supply. Additionally, the solution ejection tube 74 is connected to the ejection mechanism.

In addition, the illustrated base 90 is provided with a water tank 96 around the periphery of the recessed mounting portion 91, and stores water in this water tank 93. In the illustrated water tank 95, the partition 92 that is arranged around the periphery of the unit case 61 is used as a peripheral wall. The water is stored in an area that is divided by the partitions 92 as the water tank 96. The water tank 96 is formed outside of the partition 92 of the recessed mounting portion 91 between the partitions 92 of the recessed mounting portion 91 adjacent to each other. In the case where the water is thus stored around the periphery of the ultrasonic unit 60, in other words, in the case where the unit cases 61 of the ultrasonic units 60 are disposed in liquid, it is possible to effectively prevent explosion of the mist of alcohol or the like that is produced from the ultrasonic unit 60, that is, it is possible to provide an explosion proof effect. For this reason, the water tank 96 is designed to provide predetermined area and water storage amount to effectively provide an explosion proof effect.

In the thus-configured ultrasonic separation apparatus, a plurality of the ultrasonic units 60 are mounted to the base 90 inside the atomization chamber 4 to compose the ultrasonic atomization device 1. In the state where a plurality of ultrasonic units 60 are mounted to the base 90, the solution is supplied to the interior of the tubelike member 6 from the feed mechanism 7. The ultrasonic oscillator 2 oscillates the solution inside the tubelike member 6 at an ultrasonic frequency, thus, the solution is atomized into the mist through the opening 12 of the tubelike member 6. In addition, the mist produced by a plurality of the ultrasonic units 60 is ejected outside the unit case 61 by using the carrier gas that is supplied from the supplying opening 14.

The ultrasonic atomization devices according to the aforementioned embodiments include the tubelike member in the divided chamber section. However, in the present invention, the tubelike member is necessarily disposed in the divided chamber section. In the ultrasonic atomization apparatus that does not include the tubelike member, the liquid surface can be oscillated at an ultrasonic frequency by the ultrasonic oscillator that is disposed in the bottom of the divided chamber section, thus, the undiluted solution can be atomized into the mist. Furthermore, in the ultrasonic atomization devices according to the aforementioned embodiments, one ultrasonic oscillator is disposed in one divided chamber section. However, in the present invention, a plurality of ultrasonic oscillators can be disposed in one divided chamber section.

In addition, the ultrasonic atomization devices 1 shown in FIG. 1 and FIG. 9 include a demister or demisters 97 that primarily collect the mist that is ejected from the divided chamber sections 5. In the ultrasonic atomization device 1 of FIG. 1, the demister 97 is mounted on the upper ends of the partitions 8 that divide the atomization chamber 4. In the ultrasonic atomization device 1 of FIG. 9, the demister 97 is mounted on the upper end of the unit case 61 of each ultrasonic unit 60. Thus, the demister 97 collects the mist that is contained in the carrier gas that is ejected from the divided chamber section 5. In these ultrasonic atomization devices 1, after the mist is primarily collected from the carrier gas by the demister 97, the carrier gas is ejected from the atomization chamber 4.

In the ultrasonic atomization device 1 shown in FIG. 10, each of the unit cases 61 as the divided chamber sections 5 has an opening that is opened at the upper end. The carrier gas containing the mist is ejected from these openings. The carrier gas flows that are ejected from divided chamber sections 5 gather, thus, the carrier gas is ejected from the atomization chamber 4. In the illustrated ultrasonic atomization device 1, the periphery of the upper end opening of each unit case 61 is closed by a closing lid 98, thus, a transfer path for the produced mist is separated from the water tank 96.

After the mist is atomized in a plurality of the divided chamber sections 5, and is ejected from the atomization chamber 4, the mist flows into the collection portion 40 by using the carrier gas. In order that the mist may flow into the collection portion 40, in the ultrasonic separation apparatuses shown in FIGS. 1, 9 and 10, the collection portion 40 is connected to the ultrasonic atomization device 1 by a circulation duct 41. The illustrated ultrasonic separation apparatus is configured to circulate carrier gas around the collection portion 40 and the ultrasonic atomization device 1 by using the blower 48. In these ultrasonic separation apparatuses, after the carrier gas is transferred from the ultrasonic atomization device 1 to the collection portion 40, and the mist component is separated from the carrier gas, the carrier gas flows back to the ultrasonic atomization device 1. In the ultrasonic separation apparatuses, the carrier gas is preferably an inert gas such as nitrogen, helium and argon, or hydrogen. In this case, the inert gas prevents deterioration of the solution in the ultrasonic atomization device 1 or the collection portion 40. Therefore, a high concentration solution with higher quality can be obtained. However, air can be used as the carrier gas.

In addition, in the case where helium or hydrogen is used as the carrier gas, it is possible to improve atomization efficiency. The reason is that the saturation vapor pressure of helium and hydrogen is very high as compared with air. Since helium and hydrogen, which have high saturation vapor pressure, can contain a large amount of target material in unit volume, they likely allow the solution to atomize into mist. For this reason, as compared with an apparatus that uses air as the carrier gas, an apparatus that uses helium or hydrogen as the carrier gas has an advantage that multiplies the atomization amount of mist by several times in the case of the same output of ultrasonic oscillator.

In this regard, as compared with the case where an alcohol solution is atomized into mist by using air as the carrier gas, in the case of helium as the carrier gas, the atomization amount of mist can be multiplied by about 2.5 times, in addition, in the case of hydrogen as the carrier gas, the atomization amount of mist can be multiplied by about 4.4 times.

The mist that is produced by the thus-configured ultrasonic atomization device is transferred to the collection portion by using the carrier gas, and is separated from the carrier gas and is thus collected in the collection portion. The collection portion 40 aggregates the fine mist, and collects the mist as the target material containing liquid that contains the target material with higher concentration than the undiluted solution. Accordingly, this collection portion can use any structure that has been already developed or will be developed to aggregate and collect fine mist. Since mist is not gas, it possible to aggregate and collect mist without cooling the mist. But, mist can be quickly collected by cooling the mist. For example, the collection portion can include a cooling heat exchanger that cools and aggregates the mist to cool and highly aggregate the mist that flows into the collection portion and thus to collect the mist as a solution.

In addition, although not illustrated, the collection portion can be so designed that a vapor of target material such as alcohol contained in the carrier gas is absorbed into an absorbing agent and collected. In such a collection portion, for example, the alcohol absorbed into the absorbing agent can be released by using a heated collection gas, and the collection gas is then cooled to aggregate and collect the removed alcohol. Such a collection portion can be configured of a rotor with the absorbing agent provided in voids and a rotational drive mechanism for rotating the rotor. The rotor is a honeycomb rotor having the voids through which gas can pass in the direction of the rotational axis. As the absorbing agent, for example, any one of zeolite, activated carbon, lithium oxide and silica gel or a mixture of them can be used. In this collection portion, the rotor is rotated at a predetermined speed by means of the rotational drive mechanism and moved between an absorbing region in which the vapor is absorbed and a releasing region in which the absorbed vapor is released. When the rotor is moved into the absorbing region, the gas containing the vapor of alcohol that is the target material is passed through the voids, and the alcohol as a target material that is contained in the gas is absorbed by the absorbing agent. When the rotor is rotated and moved into the releasing region, the absorbed alcohol as a target material is released. The released alcohol of the target material is collected by cooling the collected gas. The carrier gas that passes through the absorbing region of the rotor is moved back to the atomization chamber again.

In addition, as compared with an apparatus that uses air as the carrier gas, an apparatus that uses helium or hydrogen as the carrier gas for the produced mist has an advantage that efficiently absorbs the target material by using the absorbing agent. The reason is that, since the molecular weights of helium and hydrogen are very small, as compared with air, the sizes of helium and hydrogen are also small. In this regard, the molecular weight of helium is $1/7$ of the molecular weight of air, and the molecular weight of hydrogen is about $1/15$ of air. The absorbing agent is designed to adsorb the target material with a specific size and to separate the target material from the carrier gas. But this absorbing agent does not adsorb very small helium or hydrogen together with the target material. The absorbing agent efficiently absorbs only the target material and separates the target material from the carrier gas.

In addition, in the collection portion can include a nozzle that is disposed in a closed chamber to discharges a solution. The solution is sprayed from this nozzle so that the mist contained in the carrier gas can be collected. In addition, the collection portion can include a plurality of baffle plates that are disposed in the interior of the collection portion. When the mist collides with the surfaces of the baffle plates, the mist that is adhered on the surfaces drops by its own weight, and thus can be collected. The baffle plates can have asperities on their surfaces so that the mist more effectively comes in contact with the surfaces and is thus collected. Additionally, the collection portion can include a fan that forcedly blows gas to agitates the mist. The mist is agitated in the collection portion, and mist clusters collide with each other, thus, the mist aggregates. The mist that has aggregated quickly drops, and thus can be collected.

In addition, the collection portion can include a mist oscillator that oscillates the mist to increase the probability of collision of the mist clusters. The mist oscillator can include an electrical oscillation to mechanical oscillation converter that oscillates the gas in the collection portion, and an oscillation power supply that drives the electrical oscillation to mechanical oscillation converter. The mist oscillator emits sound in an audio frequency range or ultrasonic sound higher than the audio frequency range from the electrical oscillation to mechanical oscillation converter to intensely oscillate the mist so that the mist clusters collide with each other, thus, the mist is collected.

Moreover, the collection portion can include all of the nozzle for spraying the solution, the fan for agitating the mist, and the oscillator for oscillating the mist. In this case, the collection portion can most effectively aggregate the mist. In addition, the collection portion can include two of the devices for aggregating the mist. In this case, the collection portion can effectively aggregate the mist.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-185980 filed in Japan on Jul. 5, 2006 and No. 2007-169587 filed in Japan on Jun. 27, 2007, the contents of which are incorporated herein by references.

What is claimed is:

1. An ultrasonic solution separation apparatus that oscillates an undiluted solution containing a target material at an ultrasonic frequency to produce mist, and collects the mist to collect a target material containing liquid that contains the target material with higher concentration than the undiluted solution, the apparatus comprising:

an atomization chamber that oscillates the undiluted solution at an ultrasonic frequency by using a plurality of ultrasonic oscillators to produce the mist; and a collection portion that collects the mist produced in the atomization chamber, wherein the atomization chamber is divided into a plurality of divided chamber sections so that the ultrasonic oscillators are disposed in the divided chamber sections, and the ultrasonic oscillators oscillate the undiluted solution that is supplied into the divided chamber sections at an ultrasonic frequency to produce the mist, wherein the mist that is ejected from the divided chamber sections is collected to collect the target material containing liquid.

2. The ultrasonic solution separation apparatus according to claim 1, wherein partitions divide the interior of the atomization chamber into the plurality of divided chamber sections.

3. The ultrasonic solution separation apparatus according to claim 2, wherein the partitions divide the interior of the atomization chamber in a grid shape so that the plurality of divided chamber sections are arranged adjacent to each other in length and width directions, and communication openings are opened in lower end parts of the partitions that are located between the divided chamber sections adjacent to each other so that the undiluted solution that is supplied to the atomization chamber can move between the divided chamber sections adjacent to each other.

4. The ultrasonic solution separation apparatus according to claim 3, wherein the plurality of divided chamber sections are communicated to each other in series through the communication openings.

5. The ultrasonic solution separation apparatus according to claim 1, wherein a plurality of unit cases are arranged in the interior of the atomization chamber, and the divided chamber sections are defined by the unit cases.

6. The ultrasonic solution separation apparatus according to claim 1, wherein supplying openings that supply carrier gas to the mist of the undiluted solution that is produce by the ultrasonic oscillators are arranged in bottom parts of the divided chamber sections, and the produced mist passes the divided chamber section and is ejected outside by using the carrier gas that is supplied through the supplying openings.

7. The ultrasonic solution separation apparatus according to claim 1, wherein tubelike members are disposed above the ultrasonic oscillators, and the tubelike members have openings that discharge the undiluted solution that is oscillated at an ultrasonic frequency by the ultrasonic oscillators to produce into the mist.

8. The ultrasonic solution separation apparatus according to claim 6, wherein the tubelike member includes an inner tubelike section (6*a*), and an outer tubelike section (6*b*) outside the inner tubelike section (6*a*), and a carrier gas duct is arranged between the inner tubelike section (6*a*) and the outer tubelike section (6*b*), wherein the duct has the supplying opening that is opened around the periphery of the opening of the tubelike member, and discharges the carrier gas through the supplying opening.

9. The ultrasonic solution separation apparatus according to claim 1, wherein the atomization chamber includes a plurality of ultrasonic units, and a base that detachably mounts the ultrasonic units, wherein the ultrasonic unit includes a unit case that is supplied with the undiluted solution in the interior thereof, the ultrasonic oscillator that is arranged on the bottom of unit case, and a tubelike member that has an opening that discharges the undiluted solution that is oscillated at an ultrasonic frequency by the ultrasonic oscillator to produce the mist, wherein the interior of the unit case serves as the divided chamber section, and the unit case has a supplying opening that supplies carrier gas to the mist of the undiluted solution that is discharged from the tubelike member, wherein the plurality of ultrasonic units are mounted to the base so that the undiluted solution is supplied to each unit case from the base, and the mist that is discharged from the tubelike member is ejected outside the divided chamber section by using the carrier gas that is supplied to the supplying opening so that the mist that is ejected from the ultrasonic units is collected to collect the target material containing liquid.

10. The ultrasonic solution separation apparatus according to claim 7, wherein a detachable unit is composed of the tubelike member and the ultrasonic oscillator that are unitarily coupled to each other, and the detachable unit is detachably attached to the bottom of the divided chamber section.

11. The ultrasonic solution separation apparatus according to claim 1, wherein the apparatus further comprises connection units, wherein the connection unit is composed of a high frequency power source and the ultrasonic oscillator that are unitarily coupled to each other, wherein the high frequency power source is connected to the ultrasonic oscillator, and supplies high-frequency power to the ultrasonic oscillator to oscillate the ultrasonic oscillator at an ultrasonic frequency, wherein the connection unit is detachably mounted to the bottom of the divided chamber section.

12. The ultrasonic solution separation apparatus according to claim 11, wherein the unit case includes a solution supply tube that supplies the undiluted solution, and a power cord that supplies electric power to the ultrasonic oscillator, wherein an ultrasonic unit is mounted to the base so that the solution supply tube and the power cord are detachably connected to the base.

13. The ultrasonic solution separation apparatus according to claim 11, wherein the unit case includes a gas supplying tube that supplies carrier gas to a duct of the tubelike member, wherein the ultrasonic unit is mounted to the base so that the gas supplying tube is detachably coupled to the base.

14. The ultrasonic solution separation apparatus according to claim 6, wherein a demister is disposed in the atomization chamber on the ejection side where the carrier gas containing the mist is ejected, and the demister collects a part of the mist.

15. The ultrasonic solution separation apparatus according to claim 6, wherein the carrier gas is helium.

16. The ultrasonic solution separation apparatus according to claim 6, wherein the carrier gas is hydrogen.

* * * * *

UNITED STATES PATENT AND TRADEMARK OFFICE

CERTIFICATE OF CORRECTION

PATENT NO. : 7,504,026 B2
APPLICATION NO. : 11/822248
DATED : March 17, 2009
INVENTOR(S) : Kazuo Matsuura et al.

It is certified that error appears in the above-identified patent and that said Letters Patent is hereby corrected as shown below:

On the Title Page Item  (75) should read Inventors: Kazuo Matsuura, Naruto (JP); ~~Fusaisugu~~ Fusatsugu Abe, Naruto (JP)

Signed and Sealed this

Thirtieth Day of June, 2009

JOHN DOLL
*Acting Director of the United States Patent and Trademark Office*